(12) United States Patent
Lethin et al.

(10) Patent No.: US 8,661,422 B2
(45) Date of Patent: Feb. 25, 2014

(54) METHODS AND APPARATUS FOR LOCAL MEMORY COMPACTION

(75) Inventors: Richard A. Lethin, New York, NY (US); Allen K. Leung, New York, NY (US); Benoit J. Meister, New York, NY (US); Nicolas T. Vasilache, New York, NY (US); David E. Wohlford, Portland, OR (US)

(73) Assignee: Reservoir Labs, Inc., New York, NY (US)

( * ) Notice: Subject to any disclaimer, the term of this patent is extended or adjusted under 35 U.S.C. 154(b) by 1287 days.

(21) Appl. No.: 12/365,780

(22) Filed: Feb. 4, 2009

(65) Prior Publication Data

US 2010/0192138 A1 Jul. 29, 2010

Related U.S. Application Data

(60) Provisional application No. 61/065,294, filed on Feb. 8, 2008.

(51) Int. Cl.
*G06F 9/45* (2006.01)

(52) U.S. Cl.
USPC ........................................................ 717/151

(58) Field of Classification Search
USPC ........................................................ 717/151
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,613,136 A | 3/1997 | Casavant et al. | |
| 5,742,814 A | 4/1998 | Balasa et al. | |
| 5,920,854 A | 7/1999 | Kirsch et al. | |
| 5,953,531 A | 9/1999 | Megiddo et al. | |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |
| 6,279,113 B1 | 8/2001 | Vaidya | |
| 6,327,699 B1 | 12/2001 | Larus et al. | |
| 6,338,057 B1 | 1/2002 | Weeks | |
| 6,651,246 B1 | 11/2003 | Archambault et al. | |
| 6,754,650 B2 | 6/2004 | Cho et al. | |

(Continued)

OTHER PUBLICATIONS

International Report on Patentability dated Mar. 31, 2011 for PCT Application No. PCT/US2009/057194.

(Continued)

*Primary Examiner* — Idriss N Alrobaye
*Assistant Examiner* — Brooke Taylor
(74) *Attorney, Agent, or Firm* — Goodwin Procter LLP

(57) ABSTRACT

Methods, apparatus and computer software product for local memory compaction are provided. In an exemplary embodiment, a processor in connection with a memory compaction module identifies inefficiencies in array references contained within in received source code, allocates a local array and maps the data from the inefficient array reference to the local array in a manner which improves the memory size requirements for storing and accessing the data. In another embodiment, a computer software product implementing a local memory compaction module is provided. In a further embodiment a computing apparatus is provided. The computing apparatus is configured to improve the efficiency of data storage in array references. This Abstract is provided for the sole purpose of complying with the Abstract requirement rules. This Abstract is submitted with the explicit understanding that it will not be used to interpret or to limit the scope or the meaning of the claims.

39 Claims, 9 Drawing Sheets

(56) References Cited

U.S. PATENT DOCUMENTS

| | | | |
|---|---|---|---|
| 6,772,415 | B1 | 8/2004 | Danckaert et al. |
| 6,785,677 | B1 | 8/2004 | Fritchman |
| 6,792,546 | B1 | 9/2004 | Shanklin et al. |
| 6,880,087 | B1 | 4/2005 | Carter |
| 6,912,526 | B2 | 6/2005 | Akaboshi |
| 6,952,694 | B2 | 10/2005 | Mathur et al. |
| 6,952,821 | B2 | 10/2005 | Schreiber |
| 7,086,038 | B2 | 8/2006 | Cronquist et al. |
| 7,185,327 | B2 | 2/2007 | Scales |
| 7,225,188 | B1 | 5/2007 | Gai et al. |
| 7,260,558 | B1 | 8/2007 | Cheng et al. |
| 7,594,260 | B2 | 9/2009 | Porras et al. |
| 7,634,566 | B2 | 12/2009 | Turner et al. |
| 7,757,222 | B2 | 7/2010 | Liao et al. |
| 8,087,010 | B2 | 12/2011 | Eichenberger et al. |
| 8,108,845 | B2 | 1/2012 | Little et al. |
| 8,230,408 | B2 | 7/2012 | Eng |
| 8,250,550 | B2 | 8/2012 | Luszczek et al. |
| 8,255,890 | B2 | 8/2012 | Luszczek et al. |
| 8,307,347 | B2 | 11/2012 | Austin et al. |
| 2002/0021838 | A1 | 2/2002 | Richardson et al. |
| 2003/0097652 | A1 | 5/2003 | Roediger et al. |
| 2004/0034754 | A1 | 2/2004 | Schreiber |
| 2004/0068501 | A1 | 4/2004 | McGoveran |
| 2005/0114700 | A1 | 5/2005 | Barrie et al. |
| 2006/0048121 | A1 | 3/2006 | Blainey et al. |
| 2006/0048123 | A1 | 3/2006 | Martin |
| 2006/0085858 | A1 | 4/2006 | Noel et al. |
| 2007/0033367 | A1* | 2/2007 | Sakarda et al. ............... 711/170 |
| 2007/0074195 | A1 | 3/2007 | Liao et al. |
| 2007/0192861 | A1 | 8/2007 | Varghese et al. |
| 2008/0010680 | A1 | 1/2008 | Cao et al. |
| 2009/0037889 | A1* | 2/2009 | Li et al. ......................... 717/140 |
| 2009/0083724 | A1* | 3/2009 | Eichenberger et al. ....... 717/160 |
| 2009/0119677 | A1 | 5/2009 | Stefansson et al. |
| 2009/0259997 | A1 | 10/2009 | Grover et al. |
| 2009/0307673 | A1 | 12/2009 | Eichenberger et al. |
| 2010/0050164 | A1 | 2/2010 | Van De Waerdt et al. |
| 2010/0162225 | A1 | 6/2010 | Huang et al. |

OTHER PUBLICATIONS

International Search Report and the Written Opinion dated Mar. 18, 2010 for PCT Application No. PCT/US2009/057194.
Software Tools to Optimize BMD Radar Algorithms to COTS Hardware: Phase II Proposal, Reservoir Labs, Inc., Topic No. MDA06-031, Proposal No. B2-1415.
Optimizing and Mapping Tool Chain for FPGA Programming—Phase II Proposal, Reservoir Labs, Inc., Topic No. SB062-006, Proposal No. D2-0627.
Darte and Vivien's Algorithm, "Chapter 5: Parallelism Detection In Nested Loops", pp. 193-226.
"The Cell Roadmap", Published on PPCNUX at http://www.ppcnux.com/?q=print/6666.
"ClearSpeed™ Introductory Programming Manual—The ClearSpeed Software Development Kit", ClearSpeed Technology Inc. 2007.
"ClearSpeed™ ClearSpeed Programming Model: An introduction", ClearSpeed Technology Inc. 2007.
"ClearSpeed™ ClearSpeed Programming Model: Card-side Libraries", ClearSpeed Technology Inc. 2007.
"ClearSpeed™ ClearSpeed Programming Model: Optimizing Performance", ClearSpeed Technology Inc. 2007.
Ayers et al, Aggressive inlining, PLDI '92 Las Vegas, NV, USA.
Bastoul, "Efficient Code Generation for Automatic Parallelization and Optimization", Proceedings of the Second International Symposium on Parallel and Distributed Computing, 2003.
Bastoul, "Code Generation in the Polyhedral Model Is Easier Than You Think", Proceedings of the 13$^{th}$ International Conference on Parallel Architecture and Compilation Techniques, 2004.
Bastoul et al, "Putting Polyhedral Loop Transformations to Work", INRIA, No. 4902, Jul. 2003.

Bondhugula et al, "Automatic Mapping of Nested Loops to FPGAs", OSU, Mar. 19, 2007.
Bondhugula et al, "A Practical and Fully Automatic Polyhedral Program Optimization System", OSU OSU-CISRC-10/07-TR70, Dec. 14, 2007.
Cifuentes, "Structuring Decompiled Graphs", Department of Computer Science, Univ. of Tasmania, 1994.
Cifuentes, "Structuring Decompiled Graphs", Department of Computer Science, Univ. of Tasmania, 1996.
Clauss et al, "Deriving Formulae to Count Solutions to Parameterized Linear Systems using Ehrhart Polynomials: Applications to the Analysis of Nested-Loop Programs", Apr. 10, 1997.
Collard et al, "Automatic Generation of Data Parallel Code", Proceedings of the Fourth International Workshop on Compilers for Parallel Computers, Dec. 1993.
Collberg et al, "Manufacturing Cheap, Resilient, and Stealthy Opaque Constructs", POPL 98, San Diego, CA 1998.
Darte et al, "Revisiting the decomposition of Karp, Miller and Winograd", Parallel Processing Letters, 1995.
Feautrier, "Array Expansion", Labratoire PRiSM, Jul. 1998.
Feautrier, "Some efficient solutions to the affine scheduling problem Part I One-dimensional Time", Laboratoire MASI, Institute Blaise Pascal, Universite de Versailles St-Quentin, Apr. 23, 1993.
Ferrante et al, "The Program Dependence Graph and Its Use in Optimization", ACM Transactions on Programming Languages and Systems, vol. 9, No. 3, Jul. 1987, pp. 319-349.
Franke et al, "Compiler Transformation of Pointers to Explicit Array Accesses in DSP Applications", Institute for Computing Systems Architecture (ICSA), University of Edinburgh.
Gautam et al, "The Z-Polyhedral Model", PPoPP'07, San Jose, CA Mar. 14-17, 2007.
Griebl, "On the Mechanical Tiling of Space-Time Mapped Loop Nests", Fakultat fur Mthemetik und Informatik, Universitat Passau, Germany.
Griebl et al, "Space-Time Mapping and Tiling: A Helpful Combination", Concurrency and Comput.: Pract. Exper. 2004, 16:221-246.
Griebl, "Automatic Parallelization of Loop Programs for Distributed Memory Architectures" Fakultat fur Mathematik und Informatik, Jun. 2, 2004.
Griebl et al, "Forward Communication Only Placements and their Use for Parallel Program Construction", University of Passau.
Irigoin et al, "Supernode Partitioning", Proceedings of the 15$^{th}$ Annual ACM, SIGACT-SIGPLAN Symposium on Principles of Programming Languages, San Diego, CA, Jan. 1988.
Jimenez et al, "Register Tiling in Nonrectangular Iteration Spaces", ACM Transactions on Programming Languages and Systems, vol. 24, No. 4, pp. 409-453, Jul. 2002.
Kandemir et al, "Optimizing Spatial Locality in Loop Nests using Linear Algebra", Proc. 7$^{th}$ International Workshop on Compliers for Parallel Computers, Sweden Jun. 1998.
Lethin, "Software Tools to Optimize BMD Radar Algorithms to COTS Hardware—Final Report", Sep. 12, 2007.
Lethin et al, "Mapping Loops for the ClearSpeed Processor Using the R-Stream Compiler", Feb. 4, 2008.
Lethin et al, "The R-Stream 3.0 Compiler", Feb. 4, 2008.
Lim et al, "Maximizing Parallelism and Minimizing Synchronization with Affine Transforms", 24$^{th}$ Annual ACM SIGPLAN-SIGACT Symposium on Principles of Programming Languages, Paris, France, Jan. 1997.
Loechner et al, "Precise Data Locality Optimization of Nested Loops", The Journal of Supercomputing, 21, pp. 37-76, 2002.
Meister et al, "Optimizing and Mapping Tool Chain for FPGA Programming—Final Report Phase 1 SBIR Project", Sep. 28, 2007.
Pop et al, "Induction Variable Analysis with Delayed Abstractions", ACM Transactions on Architecture and Code Optimization, vol. V, No. N, pp. 1-30, Aug. 2005.
Pop et al, "Fast Recognition of Scalar Evolutions on Three-Address SSA Code", CRI/ENSMP Research Report, A/354/CRI, Apr. 1, 2004.
Quillere et al, "Generation of Efficient Nested Loops from Polyhedra" 2000 Kluwer Academic Publishers, 2000.
Quinton et al, "On Manipulating Z-polyhedra", IRISA, Publication Interne No. 1016, Jul. 1996.

(56) References Cited

OTHER PUBLICATIONS

Schreiber et al, "Near-Optimal Allocation of Local Memory Arrays", HP Laboratories, Palo Alto, Feb. 17, 2004.
Springer et al, "An Architecture for Software Obfuscation—Final Technical Report for Phase 1 SBIR", Jul. 30, 2007.
Springer et al, "An Architecture for Software Obfuscation", PowerPoint presentation.
Vasilache, "Scalable Program Optimization Techniques in the Polyhedral Model", Thesis, Universite de Paris-SUD, UFR Scientifique d'orsay Inria Futures, Sep. 28, 2007.
Vasilache et al, "Polyhedral Code Generation in the Real World", ALCHEMY Group, INRIA Futurs and LRI, Universite Paris-Sd XI.
Verdoolaege et al, "Counting Integer Points in Parametric Polytopes using Barvinok's Rational Functions", Algorithmica, available at http://www.springerlink.com/content/g762k065685n1357/.
Verge, "A note on Chernikova's Algorithm", Jul. 27, 1994.
Xue, "On Tiling as a Loop Transformation", Department of Mathematics, Statistics and Computing Science, University of New England, Australia.
Aho et al, "Compilers: Principles, Techniques, & Tools", $2^{nd}$ Edition, 2006, pp. 173-186.
Brumley et al, "Towards Automatic Generation of Vulnerability-Based Signatures", pp. 1-15.
Aldwairi et al, "Configurable String Matching Hardware for Speeding Up Intrusion Detection", ACM SIGARCH Computer Architecture News, Vo. 33, No. 1, Mar. 2005, pp. 99-107.
Aho et al, "Efficiant String Matching: An Aid to Bibliographic Search", Communications of the ACM, vol. 18, No. 6, Jun. 1975, pp. 333-340.
Lethin et al, "The R-Stream 3.0: Polyheadral Mapper", XPCA Review, Feb. 6, 2007.
Lethin et al, "The R-Stream 3.0 Compiler", Dec. 18, 2007.
"Introduction to ClearSpeed™ Acceleration", ClearSpeed Technology Inc., 2007.
"Overview of Architecture: System Level (host) Architecture and ClearSpeed™ Architecture", ClearSpeed Technology Inc., 2007.
"ClearSpeed™ Programming Model: Case Study", ClearSpeed Technology Inc., 2007.
"ClearSpeed™—Accelerator Technology Primer", ClearSpeed Technology Primer, ClearSpeed Technology, Inc., 2006.
"ClearSpeed™ Technical Training: Software Development", ClearSpeed Technology Inc., 2007.
Gustafson et al, "ClearSpeed™ Whitepaper: Accelerating the Intel® Math Kernel Library", ClearSpeed Technology Inc., 2006.
"ClearSpeed™—CSX Processor Architecture Whitepaper", ClearSpeed Technology Plc., 2006.
Schreiber et al, "Near-Optimal Allocation of Local Memory Arrays", HP Laboratories Palo Alto, HPL-2004-24, Feb. 17, 2004.
Bondhugula et al, Toward Effective Automatic Parallelization for Multi\par core Systems, in proceeding of 22nd IEEE International Symposium on Parallel and Distributed Processing, (IPDPS 2008). Miami, Florida USA, Apr. 14, 2008.
International Search Report and the Written Opinion dated Nov. 26, 2010 for PCT Application No. PCT/US2010/031524.
International Search Report and Written Opinion dated Dec. 1, 2010 for PCT/US2010/033049.
International Preliminary Report on Patentability dated Jan. 6, 2009 for PCT Application No. PCT/US2007/72260.
International Preliminary Report on Patentability dated Nov. 1, 2011 for PCT Application No. PCT/US2010/033049.
International Preliminary Report on Patentability dated Oct. 27, 2011 for PCT Application No. PCT/US2010/031524.
Ahmed et al, Synthesizing Transformations for Locality Enhancement of Imperfectly-nested Loops Nests, ACM ICS 2000, pp. 141-152.
Ahmed et al, Tiling Imperfectly-nested Loop Nests, IEEE 2000, 14 pgs.
Aho et al, Compilers, Principles, Techniques, and Tools, Addision-Wesley Publishing Company, pp. 173-186, Reading, MA 1985.

Aigner et al, An Overview of the SUIF2 Compiler Infrastructure, Computer Systems Laboratory, Standford University, 1999, pp. 1-14.
Allen et al, Conversion of Control Dependence to Data Dependence, ACM 1983, pp. 177-189.
Ancourt et al, Scanning Polyhedra with DO Loops, Proceedings of the third ACM SIGPLAN symposium on Principles and practice of parallel programming, Apr. 21-24, 1991, 12 pgs.
Appel, A.W., Deobfuscation is in NP, Princeton University, Aug. 21, 2002, 2 pgs.
Ball et al, Branch Prediction for Free, Technical Report #1137, University of Wisconsin, 1993, 29 pgs.
Barak et al, On the (Im)possibility of Obfuscating Programs, Advances in Cryptology 13 CRYPTO 2001, vol. 2139, pp. 1-18.
Barthou et al, Maximal Static Expansion, International Journal of Parallel Programming, vol. 28, No. 3, 2000, 20 pgs.
Bastoul, C., Generating Loops for Scanning Polyhedra: CLooG User's Guide, First Version, Rev. 1.6, Apr. 8, 2004, pp. 1-30.
Bednara et al, Synthesis for FPGA Implementations From Loop Algorithms, in Proceedings of the Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, Affine Transformations for Communication Minimal Parallelization and Locality Optimization of Arbitrarily Nested Loop Sequences, OSU CSE Technical Repot, OSU-CISRC-5/07-TR43, pp. 1-30.
Bondhugula et al, A Practical Automatic Polyhedral Parallelizer and Locality Optimizer, PDLI '08, Jun. 7-13, 2008.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
ClearSpeed, Introduction to ClearSpeed Acceleration, Powerpoint presentation, ClearSpeed Technology Plc, 2007, 133 pgs.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.

(56) References Cited

OTHER PUBLICATIONS

Cytron et al, Efficiently Computing Static Single Assignment Form and The Control Dependence Graph, Mar. 7, 1991, pp. 1-52.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1527.
Darte et al, Lattice-Based Memory Allocation, Research Report No. 2004-23, Apr. 2004, 1-43.
Ezick et al, Alef: A SAT Solver for MPI-Connected Clusters, Technical Report, Aug. 13, 2008, 21 pgs.
Feautrier et al, Solving Systems of Affine (In)Equalities: PIP's User's Guide, 4th Version, rev. 1.4, Oct. 18, 2003, pp. 1-25.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Gu et al, Symbolic Array Dataflow Analysis for Array Privatization and Program Parallelization, Proceedings of Supercomputing '95, pp. 1-19, 1995.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Search Report and the Written Opinion of the International Searching Authority dated Jan. 17, 2008 for PCT/US2007/772260.
JGAP Frequently Asked Questions, Sourceforge.net, pp. 1-61.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, R-Stream: A Parametric High Level Compiler, Reservoir Labs, Inc., 2 pgs.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, Appears in the 24th Annual ACM SIGPLAN-SIGACT Symposium on Principles of Programming Languages, Jan. 1997, pp. 1-14.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pugh, W. The Omega Test: a fast and practical integer programming algorithm for dependence analysis, ACM, Aug. 1992, pp. 1-19.
Quillere et al, On Code-Generation in the Polyhedral Model, 10 pgs.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Ros-Giralt et al, Generation of High-Performance Protocol-Aware Analyzers with Applications in Instrusion Detection Systems, Reservoir Labs, 8 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microacritecture, Proceedings of the 39th Annual IEEE/ACM International symposium on Microarchitecture, 2006, 12 pgs.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.

(56) References Cited

OTHER PUBLICATIONS

Tu et al, Automatic Array Privatization, Lecture Notes in Computer Science, vol. 1808, 2001, 22 pgs.

Tu, P., Thesis 13 Automatic Array Privatization and Demand-Driven Symoblic Analysis, University of Illinois, 1995, pp. 1-144.

Udupa et al, Deobfuscation 13 Reverse Engineering Obfuscated Code, Proceedings of the 12th Working Conference on Reverse Engineering (WCRE'05), 10 pgs. 2005.

Vangal et al, An 80-Tile 1.28TFLOPS Network-on-Chip in 65Nm CMOS, ISSCC 2007, Session 5, Microprocessors/5.2, 3 pgs.

Vasilache et al, Alef: A SAT Solver for MPI-Connected Clusters, Reservoir Labs, 6 pgs.

Wang, C., Dissertation 13 A Security Architecture for Survivability Mechanisms, University of Virginia, 2000, pp. 1-209.

Wegman et al, Constant Propagation with Conditional Branches, ACM Transactions on Programming Languages and Systems, vol. 13, No. 2, Apr. 1991, pp. 181-210.

Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.

Whaley et al, An Efficient Inclusion-Based Points-To Analysis for Strictly-Typed Languages, Lecture Notes in Computer Science, vol. 2477, 2002, 16 pgs.

Wilde, D. K., A Library for Doing Polyhedral Operations, IRISA, Publication No. 785, 1993, pp. 1-48.

Wolf et al, A Data Locality Optimizing Algorithm, Proceedings of the ACM SIGPLAN '91 Conference on Programming Language Design and Implementation, Jun. 26-28, 1991, pp. 30-44.

Wu et al, Static Branch Frequency and Program Profile Analysis, 27th IEEE/ACM International Symposium on Microarchitecture (MICRO-27), 1994, 11 pgs.

Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

Jonsson et al., "Verifying Safety Properties of a Class of Infinite-State Distributed Algorithms", Lecture Notes in Computer Science, 1995, vol. 939, pp. 42-53.

Mahajan et al., "Zchaff2004: An Efficient SAT Solver", LNCS, 2005, pp. 360-375.

Aloul et al, Solution and Optimization of Systems of Pseudo-Boolean Consraints, IEEE Transactions on Computers, vol. 56, No, 1 0, Oct. 2007, pp. 1415-1424.

Buluc et al, Parallel Sparse Matrix-Matrix Multiplication and Indexing: Implementation and Experiments, SIAM Journal of Scientific Computing (SISC), 2012.

Chang et al, Parallel sparse supports for array intrinsic functions of Fortran 90, J. Supercomput. 18(3):305-339, (2001).

Davis, Direct Methods for Sparse Linear Systems. SIAM, 2006 (100 pgs).

Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.

Gundersen et al, Sparsity in higher order methods for unconstrained optimization, Optimization Methods and Software, 27(2):275-294 (2012).

Gustavson, Two Fast Algorithms for Sparse Matrices: Multiplication and Permuted Transposition, ACM Transactions on Mathematical Software, 4(3): 250-269, 1978.

Kolda et al, Scalable Tensor Decompositions for Multiaspect Data Mining, in ICDM 2008: Proceedings of the 8th IEEE International Conference on Data Mining, Dec. 2008, pp. 363-372.

Lathauwer et al, On the Best Rank-1 and Rank-($R_1,R_2, \ldots ,R_N$) Approximation of Higher-Order Order Tensors, SIAM J. Matrix Anal. Appl., 21:1324-1342, Mar. 2000.

Lin et al, Efficient data compression methods for multidimensional sparse array operations based on the EKMR scheme, IEEE Trans. Comput., 52(12)1640-1846, (2003).

Lin et al, Efficient Representation Scheme for Multidimensional Array Operations, IEEE Transactions on Computers, 51:327-345, 2002.

Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.

Vera at al, An Accurate Cost Model for Guiding Data Locality Transformations—Politecnica de Catalunya-Barcelona University—Sep. 2005.

* cited by examiner

METHODS AND APPARATUS FOR LOCAL MEMORY COMPACTION

CROSS REFERENCE TO RELATED APPLICATIONS

This application is related to and claims the benefit of priority to U.S. Provisional Application Ser. No. 61/065,294, entitled "SYSTEM, APPARATUS, AND METHODS FOR SOURCE CODE COMPILATION", filed Feb. 8, 2008, the entirety of which is hereby incorporated by reference.

GOVERNMENT INTEREST

This invention was made with Government support under contract no. F30602-03-C-0033 awarded by Defense Advanced Research Projects Agency, W31P4Q-07-0147 awarded by Defense Advanced Research Projects Agency, FA8650-07-M-8129 awarded by the Office of the Secretary of Defense, and W9113M-07-C-0072 awarded by the Missile Defense Agency. The Government has certain rights in the invention.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads per processing core. One limitation that these architectures experience is that the current commercially available compilers can not efficiently take advantage of the increase of computational resources.

In the software design and implementation process, compilers are responsible for translating the abstract operational semantics of the source program into a form that makes efficient use of a highly complex heterogeneous machine. Multiple architectural phenomena occur and interact simultaneously; this requires the optimizer to combine multiple program transformations. For instance, there is often a trade-off between exploiting parallelism and exploiting locality to reduce the "memory wall", i.e., the ever widening disparity between memory bandwidth and the frequency of processors. Indeed, the speed and bandwidth of the memory subsystems are a performance bottleneck for the vast majority of computers, including single-core computers. Since traditional program optimization problems are associated with huge and unstructured search spaces, this combinational task is poorly achieved by current compilers, resulting in poor scalability of the compilation process and disappointing sustained performance of the supposedly optimized program.

Even when programming models are explicitly parallel (threads, data parallelism, vectors), they usually rely on advanced compiler technology to relieve the programmer from scheduling and mapping the application to computational cores, and from understanding the memory model and communication details. Even provided with enough static information and code annotations (OpenMP directives, pointer aliasing, separate compilation assumptions), traditional compilers have a hard time exploring the huge and unstructured search space associated with the mapping and optimization challenges. Indeed, the task of the compiler can hardly be called "optimization" anymore, in the traditional meaning of reducing the performance penalty entailed by the level of abstraction of a higher-level language. Together with the run-time system (whether implemented in software or hardware), the compiler is responsible for most of the combinatorial code generation decisions to map the simplified and ideal operational semantics of the source program to a highly complex and heterogeneous target machine.

Generating efficient code for deep parallelism and deep memory hierarchies with complex and dynamic hardware components is a difficult task. The compiler (along with the run-time system) now has to take the burden of much smarter tasks, that only expert programmers would be able to carry. In order to exploit parallelism, the first necessary step is to compute a representation which models the producer/consumer relationships of a program as closely as possible. The power of an automatic optimizer or parallelizer greatly depends on its capacity to decide whether two portions of the program execution may be run one after another on the same processing element or on different processing elements, or at the same time ("in parallel"). Such knowledge is related to the task of dependence analysis which aims at precisely disambiguating memory references. One issue is to statically form a compact description of the dynamic properties of a program. This process is generally undecidable and approximations have to be made.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs.

Traditional optimizing compilers perform syntactic transformations (transformations based on a representation that reflects the way the program source code text was written, such as the Abstract Syntax Tree), making the optimizations brittle since they are highly dependent on the way that the input program is written, as opposed to the more abstract representation of the program's execution offered by the polyhedral model. Moreover, syntactic transformations are not amenable to global optimizations, since the problem of optimally ordering elementary syntactic transformations is yet unsolved. Many interesting optimizations are also not available, such as fusion of loops with different bounds or imperfectly nested loop tiling.

In some situations, such as in high performance signal and image processing, the applications may primarily operate on "dense" matrices and arrays. This class of applications primarily consists of do-loops with loop bounds which are affine functions of outer indices and parameters, and array indexing functions which are affine functions of loop indices and parameters. Other classes of programs can be approximated to that class of programs.

One significant area of concern in these large scale systems is memory management. For example, in a program, a large multi-dimensional array may be allocated and used to store data. This large block of data is typically stored in memory in contiguous memory cells. Certain operations on the array may not access all portions of the data. For example, in nested loops, an outer loop may be indexed by the column of the array and an inner loop may be indexed by the rows of the array. In a situation where the loop operation only accesses a portion of the elements of the array, it would be inefficient to transfer the entire array to a processing element that is assigned the access task. Further, since portions of the array are not accessed, the loop indices may be rewritten for local access on a processing element.

There have been a number of approaches used to implement these program transformations. Typical goals of these approaches include reducing the memory size requirements to increase the amount of useful data in local memory and to reduce communication volumes. One such algorithm is described in U.S. Pat. No. 6,952,821 issued to Schreiber. Schreiber's method is applicable to non-parametric rectangular iteration spaces and employs the Lenstra-Lenstra-Lovasz (LLL) lattice basis reduction algorithm. Schreiber's methods are additionally incapable of addressing data with non-convex sets of accessed data.

Therefore a need exists for more efficient compiler architectures that optimize the compilation of source code.

SUMMARY OF THE INVENTION

The present invention provides a system, apparatus and methods for overcoming some of the difficulties presented above. Various embodiments of the present invention provide a method, apparatus, and computer software product for a class of automatic program transformations that reduce the memory size requirements by relocating and compressing the memory accesses of a program that includes loop nests with arbitrary affine indices. Exemplary methods extract a lattice of points within the iteration domain to handle iteration domains with strides, for which the values of loop counters differ by more than a unit for loop iterations executed consecutively. Other provided methods operate on programs that contain arbitrary affine array index functions; and in some instances where the program transformation handles arbitrarily complex data footprints.

An exemplary method includes receiving program source code containing loop nests with arbitrary parametric affine iteration domain containing at least one array. The method identifies inefficiencies in memory usage where the inefficiencies are related to access and the memory footprint of the arrays. The method further allocates at least one local array and maps a portion of the received arrays to one or more of the local arrays. The mapping reduces the memory size requirements and the memory footprint of the arrays.

A further embodiment provides a local memory compaction module that assists a processor in the optimization of source code. Other embodiments provide computing apparatus and computer software products that implement the described methods.

BRIEF DESCRIPTION OF THE DRAWINGS

Various embodiments of the present invention taught herein are illustrated by way of example, and not by way of limitation, in the figures of the accompanying drawings, in which.

Figure 1:
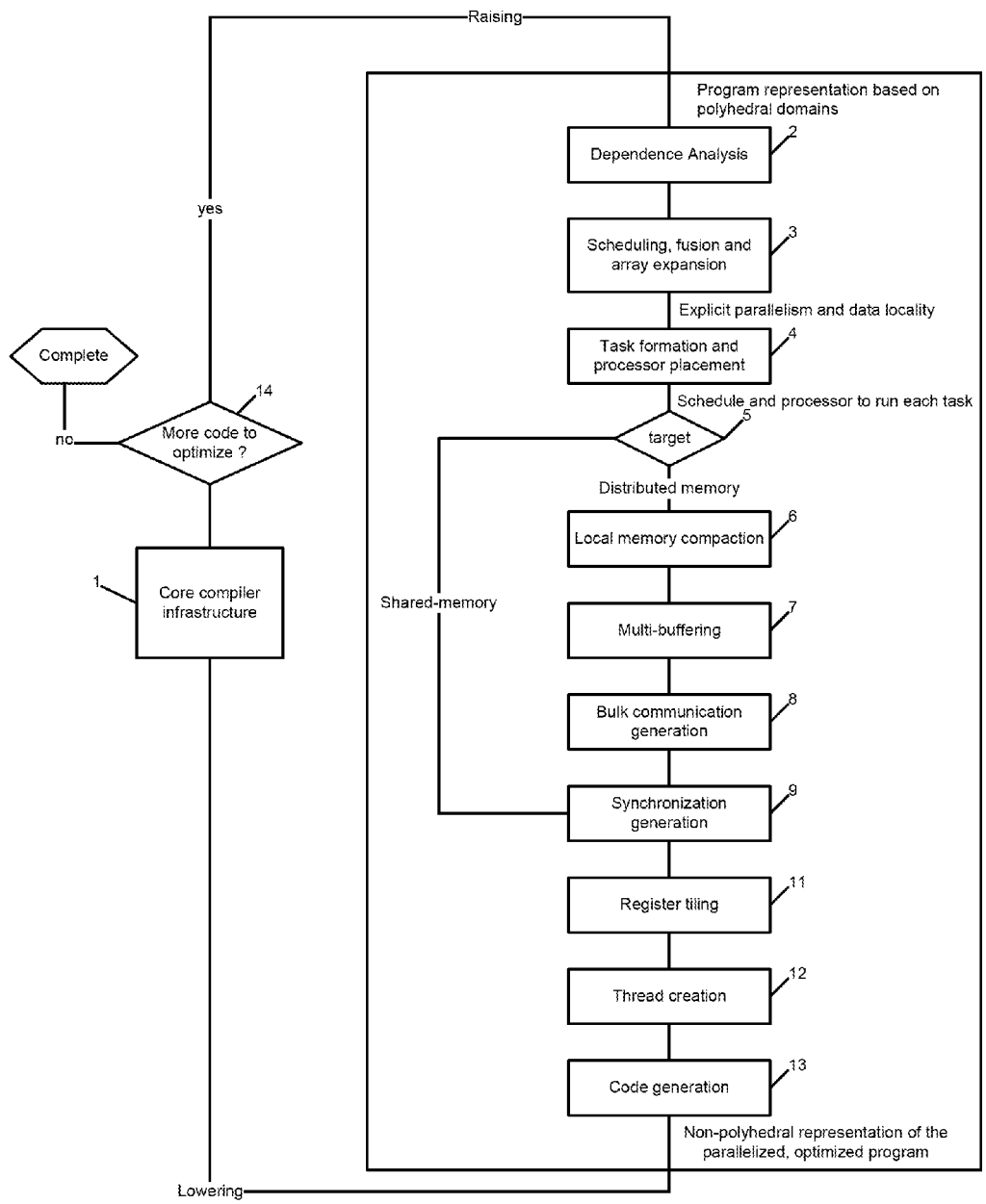
FIG. 1 is an overview of an exemplary compiler architecture consistent with provided embodiments.

It will be recognized that some or all of the figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The trend of increasing the frequency at which processors perform computations seems to have come to an end. Power consumption and control complexity have reached such high levels that manufacturers are backing out of this design path. Current machines have evolved to multiprocessor architectures on a chip with increasingly many cores per chip and multiple threads per core. This trend is expected to dramatically increase, reaching thousands of cores per chip in the next few years. Thus, modern computers increasingly need to exploit parallelism at different levels to provide sustained performance. On the other hand, parallel programming techniques have not evolved at the same speed and the gap between theoretical machine speed and actual utilization continues to increase.

Compilers are responsible for translating the abstract operational semantics of the source program, i.e., a text description of what the program's execution is supposed to perform, into an executable form that makes efficient use of a highly complex heterogeneous machine. Multiple architectural phenomena occur and interact simultaneously within the targeted computer during the execution of the program; this requires the optimizing compiler to combine multiple program transformations in order to define a program execution that takes advantage of those architectural phenomena. For instance, when targeting computers that have multiple processing elements (multi-core computers), there is often a trade-off between exploiting more processing elements simultaneously (parallelism) and exploiting data access locality to reduce memory traffic. Indeed, the speed and bandwidth of the memory subsystems are almost always a bottleneck. The problem is typically worse for multi-core computers. Since, in traditional compilers, optimization problems are associated with huge and unstructured search spaces, this combinational task is poorly achieved in general, resulting in poor scalability and disappointing sustained performance of the supposedly optimized program.

Generating efficient code for deep parallelism and deep memory hierarchies with complex and dynamic hardware components is a difficult task: the compiler (and run-time system) has to take the burden of tasks that only expert programmers would be able to carry. In order to exploit parallelism the first necessary step is to compute a representation which models the producer/consumer relationships of a program as closely as possible. The power of an automatic optimizer or parallelizer greatly depends on its capacity to decide whether two portions of the program execution may be interchanged or run in parallel. Such knowledge is related to the task of dependence analysis which aims at precisely disambiguating memory references. The issue is to statically form a compact description of the dynamic properties of a program. Forming a precise description is generally undecidable and approximations have to be made.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs. The polyhedral model is a representation of a program's structure particularly suited for expressing complex sequences of loop nests, complex sequences of loop nest transformations, and other relevant information such as for instance dependences, communications, and array layouts.

A polyhedron is defined as a set of points verifying a set of affine inequalities and equalities on a number of variables. There exist alternate but equivalent definitions for polyhedrons, such as the one based on a combination of vertices, rays and lines proposed by Minkowski. There are also alternate representations, often based on the alternate definitions. While the present disclosure teaches using one of those definitions and representations to illustrate the various embodiments, various embodiments are in no way restricted to a particular definition or representation.

A polyhedral domain is defined as a finite union of polyhedrons. One of the main interests in using polyhedral domains is that they provide a precise representation of sets and relations among sets, on which many optimization problems can be phrased and solved using a rich set of algorithms, which are mostly available in the literature. Some embodiments of the sets in question represent loop iterations, mono- and multi-dimensional data sets, sets of processing elements, data transfers, synchronizations, and dependences. Thus, essential characteristics of the execution of a program can be summarized into compact mathematical objects, polyhedrons, which can be manipulated and transcribed into an executable program that has desired execution properties.

By considering a subset of the variables of a polyhedron as symbolic constants, also called "parameters", it is possible to perform program optimizations and parallelization as a function of the symbolic constants. Hence, programs involving loops that depend on a constant value that is not known at the time when compilation is performed, but only when the program is executed, can be modeled using polyhedrons that are defined as a function of those constant values. A polyhedron involving parameters is called a parametric polyhedron. Similarly, a parametric polyhedral domain is defined by a finite union of parametric polyhedrons. For instance, the set of values that the counters of a loop nest reach during the execution of the loop nest is represented by the loop nest's "iteration domain". The iteration domain of the following loop nest (using the C language's syntax, where F is a C function call) can be written as the parametric domain P(n): $\{(i, j) \in Z^2 | 5 \leq i \leq n;\ 0 \leq j \leq 10;\ j \leq i\}$:

```
for (i=5; i<=n; i++) {
    for (j=0; j<=i && j<=10; j++) {
        F(i,j);
    }
}
```

The set of iterations of such a loop nest depends directly upon the value of the parameters. The parametric domain that represents the set of iterations is called a "parametric iteration domain". It has to be noted that the values of the loop counters are integer. Hence, the set of values of i and j also lie on a regular lattice of integer points (the standard lattice $Z^2$ in the current example). However, it is possible to represent the fact that a set belongs to a polyhedral domain as well as the fact that it also belongs to a regular lattice of points using polyhedral domains exclusively. While alternate, equivalent representations exist (for instance those based on "Z-polyhedrons", which are an explicit intersection of a polyhedral domain and a lattice of integer points), various embodiments of the present invention are in no way restricted to exclusively using polyhedral domains. The use of parametric polyhedral domains as a means to illustrate various provided embodiments. In some embodiments, either or both polyhedrons and Z-polyhedrons can be used as a representation, and there exist conversion methods between both representations.

While most of the transformations applied to the polyhedral representation of a program are defined for any element of the polyhedral domain to transform, a class of more complex and precise transformations is obtained by partitioning the vector space in which the polyhedral domain is defined into sub-polyhedrons, and by defining a different transformation for each polyhedron of the partition. The resulting transformation is called a "piecewise" transformation. For example, consider the transformation that takes two numbers i and j and computes three numbers x, y, and z as: {x=2i+1; y=(i+j)/2; z=−3j+4} when i is greater than j and {x=i; y=i−j+3; z=2j} when i is less than or equal to j. It is a piecewise affine function since it has different definitions for each set of values, {i>j} and {i≤j}, which define a partition of the (i,j) vector space.

The context of various embodiments, the use of polyhedral representations to perform complex optimizations on programs, either independently or within a system of optimizing components. An exemplary embodiment of such a system is illustrated in FIG. 1, where it is described as being part of a compiler. Flow of the exemplary embodiment starts in block 1, where the compiler is processing a program. Flow continues in block 14, where the compiler analyzes the program to decide if there are portions of the program that should be optimized and mapped using a polyhedral system. If it is the case, the flow goes to block 2, where the compiler provides the system of optimizing components with a polyhedral representation of a portion of the program to be optimized. If not, the compiler continues to process the program without using the system of optimizing components and completes. The components of the system are in charge of a part of the global optimization of the input program. In the flow of the embodiment illustrated in FIG. 1, the polyhedral representation of the input code is analyzed in block 2 to produce dependence information. Flow continues in block 3 where such information is used in a local memory compaction component or module that modifies array layouts in a way that removes some dependencies, schedules loop iterations in a way that exposes loops that scan independent iterations, and schedules the execution of operations using the same data to be executed within a close time interval. Flow continues in block 4, where the modified polyhedral representation of the program is processed by another optimizing component, which partitions the represented loop operations into entities called tasks, which have good data locality properties (they access a data set that involves an optimized use of the memory subsystem of the target computer), and assigns a processing element of the target machine to each task. In this exemplary embodiment, the flow continues to decision block 5, which decides which block is next in the flow as a function of the target machine. If the target machine requires the execution of explicit communication commands to transfer data to and from its processing elements, flow goes to block 6, where the representation of the program thus modified is then processed by a series of optimizing modules which define a new layout for data that is transferred to a processing element's local memory. Otherwise, the flow goes to block 9. From block 6, flow continues to block 7, where a representation of the explicit communications is produced, based on polyhedrons, and then to block 8, where the execution of the communications are scheduled for parallel execution with the tasks, using multi-buffering. Whether the target machine requires explicit communications or not, the flow continues to block 9, where an optimizing component processes the polyhedral representation of the program obtained from the previous components by inserting a polyhedral representation of synchronization operations, which ensure that the execution of the modified program produces the same results or similar results as the original input program. The flow of the exemplary embodiment then goes to block 11, where an optimizing component partitions the tasks into subtasks whose execution reduces traffic between the processing elements' memories and their registers. Then, in block 12, a polyhedral representation of commands that trigger the execution of a series of tasks on the different processing elements of the target machine and that wait for the completion of those, is generated by the next optimizing component. Finally, in block 13, the polyhedral representation of the optimized program is transformed by polyhedral code generation component into a representation (Abstract Syntax Tree, high-level language code, or a compiler's internal representation) that can be either processed by a compiler or processed further by the user. In the exemplary embodiment, the flow continues back to block 1, where it may cycle again through the whole flow if there is more code to be optimized using the system of optimizing components.

In contrast to compilers based on polyhedral domains, traditional loop-oriented optimizing compilers typically perform syntactic transformations. As a result, many interesting optimizations are often not available, such as fusion of loops with different bounds or imperfectly nested loop tiling.

In some embodiments, the optimizing components or modules comprise processor executable code that when executed by a processor, convert source code into other forms of source code, or in some instances machine code. In other embodiments, various modules may be implemented in hardware such as monolithic circuits, Application Specific Integrated Circuits (ASIC), or Field Programmable Gate Arrays (FPGA). These modules may comprise software, hardware, firmware, or a combination of these implementations. It is important to note that various embodiments are illustrated in specific programming languages, these illustrations are mere examples and the scope is not therefore limited to any particular programming language.

Figure 2:
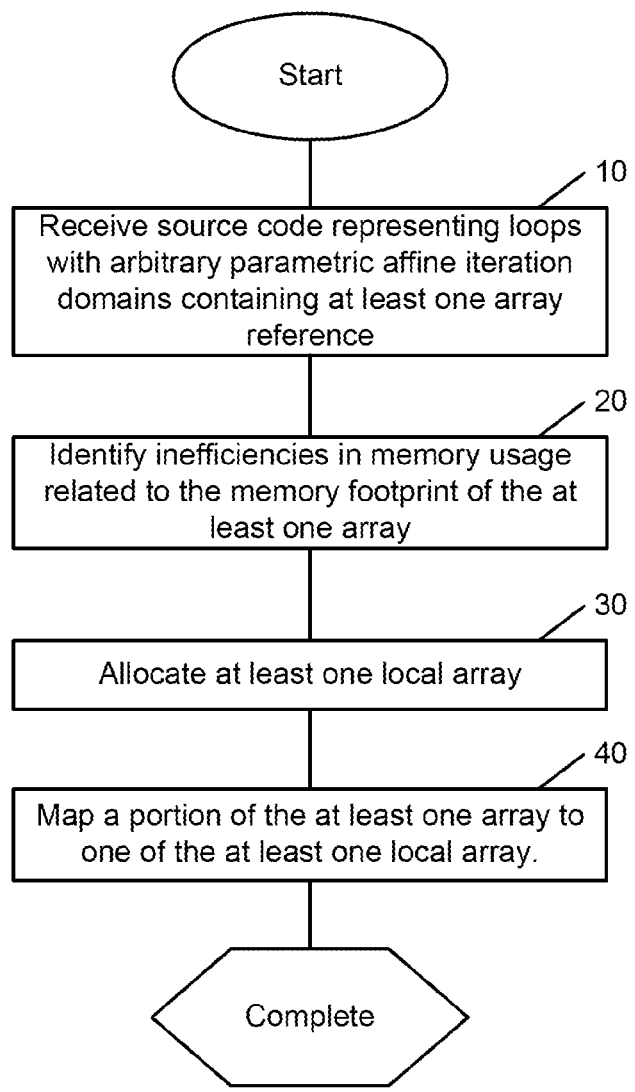
FIG. 2 illustrates the operational flow of one embodiment of a provided local memory compaction module.

Embodiments of a provided optimization module, described above as local memory compaction are illustrated in FIGS. 2-8. FIG. 2 illustrates the flow of a provided method for local memory compaction. Flow begins in block 10 where source code is received into memory. In this embodiment, the source code represents loops with arbitrary parametric affine iteration domain and contains at least one array reference. An array reference is an operation that represents an access, typically a read or a write, to an array. Such a reference represents, either explicitly or implicitly, for instance by using programming language conventions, a function to retrieve the memory address of an element of the array. In loop programs, that function is typically a direct or indirect function of the loop indices and of some loop-constant values. For instance, in C, arrays are typically referenced through mono- and multi-dimensional affine functions of some input values. In the C language, the declaration of an array includes parameters called "array size", which implicitly define the address of an array element as a function of the input values to references to this array. Declaring "char A[100][200]" allocates an array of 20000 elements (100×200), named A, and defines that for any two integer values x and y, the memory address of the element of A referenced through A[x][y] is b+200x+y, where b is a value called the "base address" of array A. b is constant for each array and is determined at some point in the compilation process. Flow continues to block 20 where inefficiencies in memory usage in the at least one array are identified. In one embodiment, the inefficiencies are related to access and memory footprint of the array. Flow then continues to block 30 where at least one local array is allocated, and in block 40 a portion of the array with inefficient memory usage is mapped into the local array. The mapping portion of the module outputs code that is more efficient than the original code in terms of the memory size requirements of the local array versus the original array. In some embodiments, the accessed data is arbitrarily complex. In further embodiments, the mapping produces a piecewise affine index function for the local arrays. Other embodiments include the rendering of a visualization of the optimized code on a monitor.

Arrays are typically allocated sets of contiguous memory blocks. Some loop operations may access only portions of the allocated memory. When reorganizing the data layout for a specific processor, there is an opportunity to take advantage of the inefficiencies in memory access requirements versus the actual utilization of the array. For example, given the following code fragment, 900,000 contiguous memory blocks are allocated, but only 100 are accessed in this operation. Furthermore, access to the array is not contiguous, but contains gaps, and thus will have less than optimal locality. Thus keeping the original data layout (and array size) in a remote processor is extremely inefficient. Moreover, if there are less than 900,000 blocks available in the local memory, the local memory cannot hold the entirety of the array and the program cannot be executed properly. In the provided code fragments, we are using "..." to elude other operations which do not have any specific illustrative purpose.

```
double A[300][300];
for (i=0; i<100; i++) {
    ... = ... A[2*i+100][3*1]; }
```

One embodiment of a provided method, illustrated in FIG. 2, would map this code fragment into a local array with 100 elements. An exemplary mapping would produce the following pseudo-code fragment, in which the storage requirement of a local array is reduced from 300×300 elements to the optimal 100 elements.

```
double A_local[100]; //local memory
transfer A[2*i+100][3*1] to A_local[i], i=0, 1, ... 99;
for (i=0; i<100; i++) {
    ... = ... A_local[i]; }
```

One feature of this embodiment is that it provides a method of compacting local memory in a computing apparatus. This method provides a more efficient memory structure in terms of both access to the elements and the amount of memory occupied by the data that is actually accessed. The memory requirements are reduced from the initial allocation to an allocation that is large enough to contain the data that is actually used in the operations. In contrast to other methods, the provided method handles loops whose iteration domains are non-rectangular, and loops that have a parametric iteration domain. In this document we refer to polyhedral iteration domains that are either non-rectangular or parametric or both as "arbitrary parametric iteration domains". In addition, the provided methods handle non-convex accessed data sets. The provided embodiments are very useful in image and video processing. Imaging applications typically utilize significant multi-dimensional arrays where data representations of physical objects and systems are stored. Many image processing steps, such as discrete wavelet transforms for example, only utilize discrete portions of the stored data. In these situations, various embodiments provide significant optimizations to local data storage.

Figure 3:
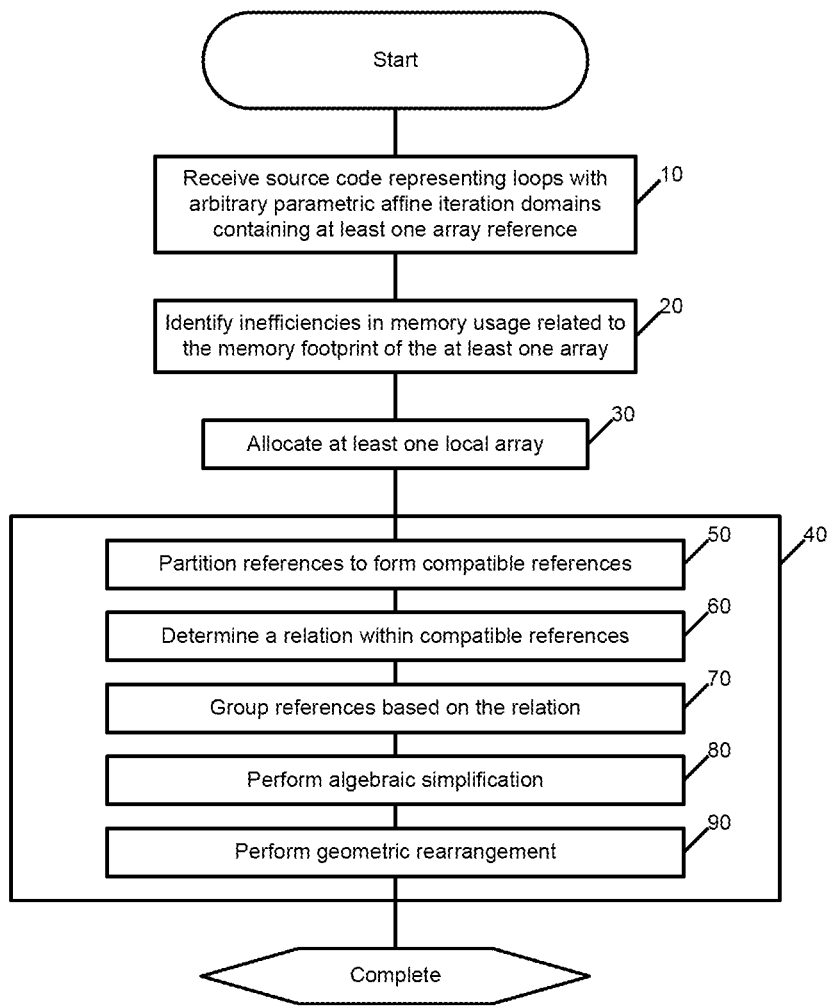
FIG. 3 illustrates the operational flow of another provided local memory compaction module, in which array references are partitioned into groups and algebraic and geometric data re-indexing functions are computed.

Another embodiment of a provided method is illustrated in FIG. 3. In this embodiment, flow begins in block 10 where source code is received in memory. Similar to the above embodiment, the source code contains loops with arbitrary parametric iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, mapping block 40 includes partitioning references to form compatible references in block 50; determining a relation within compatible references in block 60; grouping compatible references based on the relation in block 70; performing algebraic simplification in block 80; and performing geometric arrangement through re-indexing the elements of the local array in block 90. In some embodiments the set of references partitioned are references that access a portion of the array. The following pseudo-code example illustrates this embodiment.

```
float A[256] [256] ;
doall (1=128*j+16*P; 1 <= min(-i+254,128*j+16*P+15); 1++)
    doall (m = 16*k; m <= min(-i+254, 16*k+15); m++)
        A[1+i+m] [1+i+1] -= A[1-i+m] [i] * A[i] [1+i+1];
```

In this case, all three references to array A are disjoint in that they access disjoint portions of the array. In this case, they are transformed into three local arrays A__2, A__3 and A__4 in the following manner.

```
float A_2[16] [16]; // a triangular subregion of A
float A_3[16]; // a column of A
float A_3 [16]; // a row of A
doall (1 = 0; 1 <= min(15, -i-128*j-16*P+254); 1++)
    doall (m = 0; m <= min(-i-16*k+254, 15); m++)
        A_2[m] [1] -= A_3[m] * A_4[1];
```

Performing transformations of the way data are allocated in memory, i.e., transforming the data layouts, has a combinational aspect, since the data sets accessed through each array reference may overlap with one or more data sets accessed by other array references. Since each one of those overlaps entail constraints in the way that data layouts can be transformed, analyzing all the combinations of overlaps for all the references is a source of high computational complexity. Hence, references are grouped into sets in such a way that data accessed through one set of references does not overlap data accessed through another set of references. In this embodiment, references of the same set are called "compatible references". Since there is no overlap among sets of compatible references, the following parts of the memory layout transformation, which consider the overlaps, can be applied independently to each set of compatible references. In particular, they will decide if the overlapping data sets accessed by a set of compatible references should be partitioned further and how.

In some embodiments, compatible references are identified by overlapping memory footprints during the execution of a particular subset of loop iterations. In an exemplary embodiment, the provided method identifies array references having overlapping memory footprints; duplicates a portion of the identified references; and associates each of the duplicates with disjoint subsets of the memory footprint. An example pseudo-code illustrates this embodiment.

```
double A[100] [100];
for (j = 0; j < 100; j++) {
    ... = A[i] [j] * A[j] [i];
}
```

The two references A[i][j] and A[j][i] overlap when i=j. However, if the references are allocated together, it is impossible to reduce the local memory usage using only affine transformations. This is because the data footprint of the two references is a 2-dimensional set (a cross), while the data footprints of the individual references are both 1-dimensional. In order to compute better allocations in situations like this, one embodiment first estimates how much overlapping is in the references. If the references are read-only, and if the overlapping data set is a small percentage of the overall data set, the embodiment splits the references into two distinct references to one-dimensional data sets. In the above example, the embodiment will generate the following local memory allocation. Note that the center element of the data foot print, A[i][i], has been replicated and put into the locations A_l[i] and A__2[i].

```
double A__1[100];
double A__2[100];
Transfer A[i] [j] to A__1[i], i = 0 . . . 99
Transfer A[j] [i] to A__2[i], i = 0 . . . 99
for (j 0; j < 100; j++)
    ... A__1[j] * A__2[j];
```

The geometric re-arrangements provided by a further exemplary embodiment are defined by a piecewise affine transformation. In other words, the transformation applied to the references is defined as a set of functions, each element of the set being valid within a polyhedral domain of the loop values, the parameters and the coordinates of the data accessed through the set of compatible references. In an exemplary embodiment, when some of the data accessed by a set of compatible references are written by some of the references, the written data subset and a subset of the data set that is only read define a partition for the piecewise affine transformation. Consider the program represented by the following pseudo-code:

```
double A[100][100];
for (j = 0; j < 99; j++) {
    A[i] [j+1] = ... A[j] [i];
}
```

In this example, the data set accessed by the both references to array A form a two-dimensional set, while the data sets accessed through each reference are one-dimensional. The data accessed through both references overlap in A[i][i]. In the exemplary embodiment, a piecewise transformation of A is applied, which separates A into two subsets, one for each one-dimensional data set, and marks one of them as receiving the updates (let us call it the "writing reference") to the duplicated data. In the example, the duplicated data is A[i][i] and the iteration domain is partitioned into three polyhedral domains, {0≤j<i}, {j=i} and {i<j<99}, in order to take into account the fact that only one of the data subsets is updated. Such a partition of the iteration domain is obtained by defining the iterations accessing duplicate data through "non-writing" references and replacing those accesses with an access through the writing reference. The resulting piecewise affine transformation is {(A[i][j−1]=A__1[j], A[j][i]=A__2[j]) for 0≤i<100, 0≤j<i or i<j<100; and (A[i][j−1]=A__1[j], A[j][i]=A__1[j]) for 0≤i<100, i=j}. The result of the piecewise affine transformation can be represented by the following pseudo-code, which uses only two arrays as a replacement for the original array A, has quasi-optimal memory requirements (198 memory cells, while the optimal would be 197):

```
double A__1[99], A__2[99]
for (int j=0; j<i; j++) {
    A__1[j] = ... A__2[j];
}
A__1[i] = ... A__1[i−1]; // the updated value of A[j][i] is
in A__1[j] when j=i
for (int j=i+1; j< 99; j++) {
    A__1[j] = ... A__2[j];
}
```

In other exemplary embodiments, the geometric rearrangement is a piecewise affine transformation that defines a partition of the iteration domain and of the data sets in such a way that the number of references to a local array varies from one element of the partition to another. In the following example, in which the possible values of variable i are {0≤i≤99900}, the data sets accessed through reference A[j] and A[i+j] overlap when i is less than 100. Otherwise, they do not overlap.

```
double A[10000];
for (j =0; j< 100; j++) {
    A[i] = ... * A[i+j]
}
```

Since those data sets overlap for some values of i, both references are put in the same group of compatible references. If the accessed data sets are allocated as a single local array, the amount of memory necessary to contain the array is 10000 memory cells. On the other hand, if they are allocated as two separate arrays, some of the data would have to be duplicated and the iteration domain (the j loop here) would have to be partitioned as in the previous exemplary embodiment. The amount of overlap when i is less than 100 may not be small enough and it may not be profitable to perform the duplication. The geometric rearrangement provided by the embodiment is a piecewise affine transformation that defines a partition of the set of parameters (in the current example, i): {(A__1[j]=A[j]) for 0≤i<100, and (A__1[j]=A[j], A__2[j]=A[i+j]) for i≥100}. The maximum amount of memory that has to be allocated for any value of i is 200 memory cells (as compared to 10000), and it is 100+i when i is less than 100. The resulting transformation can be represented as pseudo-code as follows:

```
if (i <100) {
    double A__1[100+i];
    for (j=0; j< 100; j++) {
        A__1[j] = ... * A__1[i+j]
    }
}
else {
    double A__1[100];
    double A__2[100];
    for (j=0; j<100; j++) {
        A__1[j] = ... *A__2[j];
    }
}
```

One advantage of the geometric rearrangement that is performed by this exemplary embodiment is that the j loops are not partitioned. Partitioning the loops into smaller loops is often a factor of performance degradation, which is avoided in this exemplary embodiment. The partition of i is obtained by computing the domain in which both data sets intersect, by projecting the intersection onto the vector space of the parameters (in the current example, the parameter is i and the projected domain is {i<100}.

Figure 4:
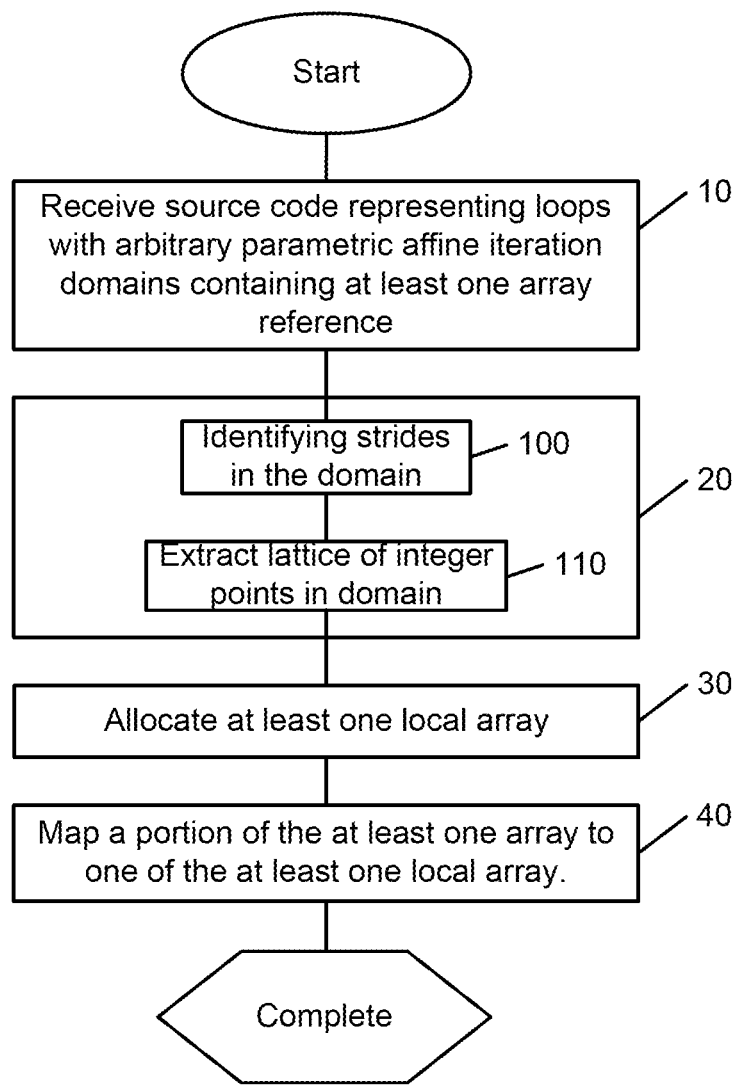
FIG. 4 illustrates the operational flow of an additional local memory compaction module in which inefficiencies in memory usage are determined using lattices of integer points.

The operation flow of a further provided embodiment of a local memory compaction module is illustrated in FIG. 4. In this embodiment, flow begins at block 10 where source code is received in memory. Similar to the above embodiment, the source code represents loops with arbitrary parametric affine iteration domains and contain at least one array reference. Flow continues to block 20 where inefficiencies in memory usage in the at least one array are identified. In this embodiment, the identification of inefficiencies includes block 100 where strides in the polyhedral domain that defines the accessed dataset are identified, and block 110 where a lattice of integer points within the domain is extracted from the domain. These integer points indicate that only a regular subset of the accessed data region is accessed. In this manner, more efficient allocation of local arrays is accomplished because portions of the array that are not accessed are identified and excluded from the mapping from the array to the local array.

Figure 5:
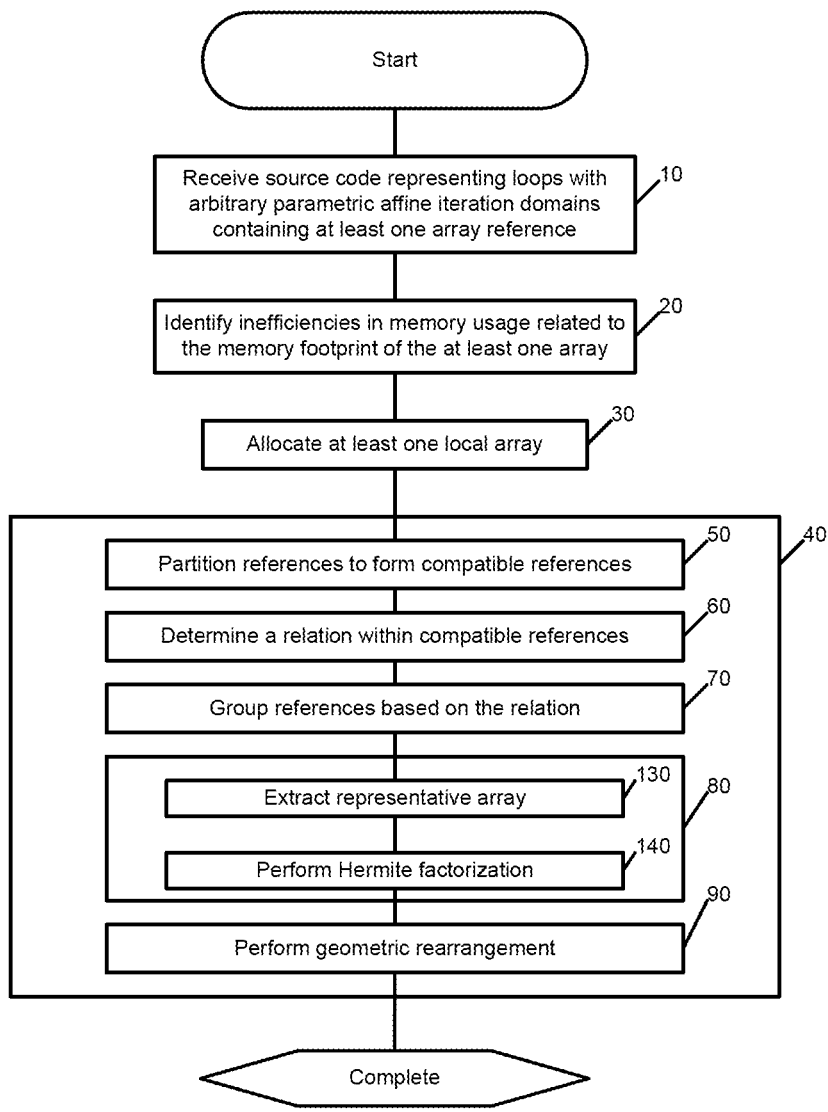
FIG. 5 illustrates the operational flow of an additional local memory compaction module for reducing the inefficiencies in local memory usage by extracting representative array references and producing re-indexing functions using Hermite factorizations.

An additional provided embodiment is illustrated in FIG. 5. In this embodiment, like earlier embodiments, flow begins at block 10 where source code is received in memory. Similar to the above embodiment, the source code represents loops with arbitrary parametric affine iteration domain and contains at least one array reference. Flow continues to block 20 where inefficiencies in memory usage in the at least one array are identified. Flow then continues to block 30 where at least one local array is allocated, and in block 40, a portion of the array with inefficient memory usage is mapped into the local array. In this embodiment, like in the embodiment illustrated by FIG. 3, mapping block 40 includes partitioning references to form compatible references in block 50; determining a relation within compatible references in block 60; grouping compatible references based on the relation in block 70; performing algebraic simplification in block 80; and performing geometric arrangement in block 90. The algebraic simplification block 80 includes block 130 where a representative array reference is extracted from a set of references accessing a portion of the array. In some embodiments, the representative array reference represents a set of references which access polyhedral datasets whose accessed points all lie on a lattice of integer points that is not the standard lattice, on which any integer point lies. These embodiments take advantage of the fact that array references represent affine functions, which can be represented as matrices called "access matrices". In the exemplary embodiment, the flow within block 40 goes from block 130 to block 140 where a Hermite factorization is performed for the access matrix representing the representative array reference. The Hermite factorization produces a piecewise affine index function.

One purpose of Hermite factorization is to reduce the dimension of the reference to the actual geometric dimension of the data footprint. In addition, if the access pattern contains strides, i.e., regular intervals between accessed data, using the non-unimodular matrix that results from the Hermite factorization in the transformation removes these strides in the resulting local references. For example, given an affine access function $f(x, y)$ on loop indices x and parameters y, we first decompose it into the sum of $g(x)+h(y)$, where $g(x)$ is a linear function on x and $h(y)$ is an affine function on y. This decomposition is an algebraic simplification that makes it possible to perform further computations on the part of $f(x,y)$ that involves variables only. Function $g(x)$ can be decomposed into $g(x)=HU$, where $H=[H'\ 0]$ is the Hermite Normal Form of $g(x)$ and U is unimodular matrix. Let $$U = \begin{bmatrix} U_1 \\ U_2 \end{bmatrix}$$

where $HU=H'U_1$. The following mapping from global to local indices is then performed $f(x, y)f \to U_1 x$.

Hermite factorizations have many uses as lattice computations. The Hermite factorization of a matrix G, written G=HU, writes matrix G as the product of two matrices, H and U. H, called the "Hermite normal form", is a canonical representation of the lattice (also) represented by G. U is a unimodular matrix, which entails that U, when used as a transformation, always transforms any point that has integer coordinates into another point that has integer coordinates. Also, any point that has integer coordinates can be obtained by transforming a point with integer coordinates using a unimodular transformation. This is important since most programming language conventions enforce that data elements, and particularly array elements, must have integer coordinates.

Figure 6:
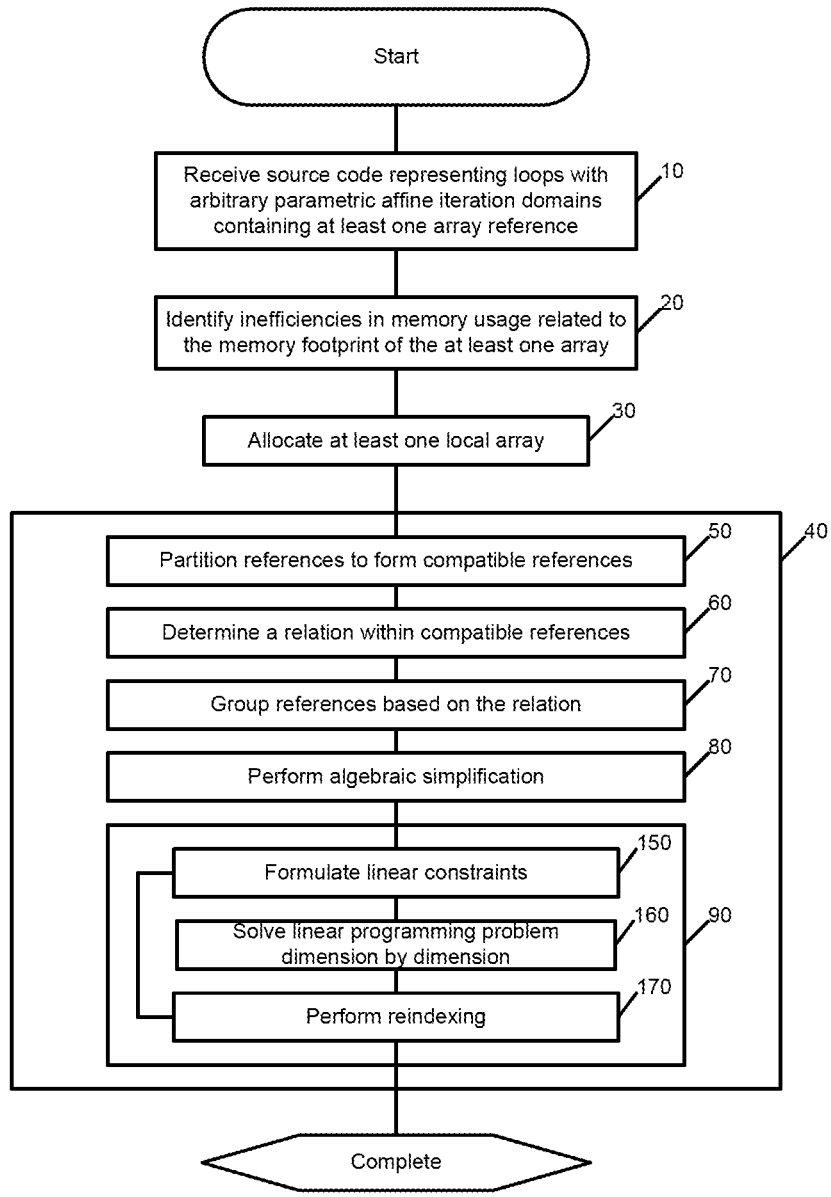
FIG. 6 illustrates the operational flow of an additional local memory compaction module for computing data re-indexing functions by producing linear constraints and solving a series of linear programming problems.

The flow of a still further provided embodiment is illustrated in FIG. 6. In this embodiment, like previous embodiments, flow begins at block 10 where source code is received in memory. Similar to the above embodiment, the source code represents loops with arbitrary parametric affine iteration domain and contain at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, mapping block 40 includes partitioning references to form compatible references in block 50; determining a relation within compatible references in block 60; grouping compatible references based on the relation in block 70; performing algebraic simplification in block 80; and performing geometric arrangement in block 90. Geometric rearrangement 90 contains blocks 150 where linear constraints are formed, block 160 where sets of linear programming problems are formed from the linear constraints and solved, and block 170 where a data reindexing is computed. In some embodiments, the flow goes back to block 150. In such embodiments, geometric rearrangements are applied iteratively until no reindexing function is found that reduces memory requirements.

Most modern programming languages abide by the convention that multi-dimensional arrays are allocated in memory as if they were canonical rectangular parallelotopes. In a space of d dimensions, a parallelotope is a finite polyhedron defined by 2d faces, and whose faces are pair-wise parallel. A canonical rectangular parallelotope is a parallelotope for which the normal vectors to its faces are either a canonical vector or the negation of a canonical vector. Examples of rectangular parallelotopes are a cube (in a 3-dimensional space) and a rectangle (in a 2-dimensional space). In an exemplary embodiment, the transformation is a unimodular reindexing of the accessed data that minimizes the size of the smallest canonical rectangular parallelotope that encloses the accessed dataset. The smaller the enclosing rectangular parallelotope, the smaller the amount of memory that has to be allocated for the dataset.

In some embodiments, this is accomplished by formulating a first set of linear constraints through the use of Farkas Lemma. This first set of linear programming constraints is decomposed dimension by dimension to form a set of integer linear programming problems. This set of problems is then solved to provide the data reindexing function which can then be applied to the at least one local array. Unimodular reindexings transform integer points into integer points. Hence, the convention that data elements have integer coordinates is preserved by such a reindexing. In the case of affine transformations, the linear part of the transformation can be represented by a unimodular matrix.

Farkas lemma is a basic linear algebra theorem which is often used to obtain, from a set of affine constraints (i.e., inequalities and equalities) on variables with unknown coefficients, constraints that apply to the unknown coefficient themselves. In this embodiment, it is used to obtain a set of constraints involving the coefficients of the unimodular data reindexing function (which is represented as a matrix) and the width of the enclosing rectangular parallelotope along each dimension. From those obtained constraints, the method embodiment finds values of the coefficients of the unimodular data reindexing function for which the width is minimal, using integer linear programming. For example, the data set accessed through reference B[i+j][j] in the following pseudo-code can be reindexed so as to occupy only 100 memory cells:

```
Double A[n+10][n+10];
Double B[[2n+20][n+10];
For (i=n; i<n+10; i++) {
    For (j=n; j<n+10; j++) {
        A[i][j] = ... B[i+j][i];
    }
}
```

The coordinates $(x_1, x_2)$ of the elements of array B accessed by that loop node are defined by the constraints D: $\{n \le x_2 < n+10; n \le x_1 \le n+10\}$. The embodiment finds values of the coefficient of a matrix U such that U is unimodular and the coordinates $x'_1$ and $x'_2$ of the reindexed data are defined by:

$$\begin{bmatrix} x'_1 \\ x'_2 \end{bmatrix} = U \begin{bmatrix} x_1 \\ x_2 \end{bmatrix} + \begin{bmatrix} t_1 \\ t_2 \end{bmatrix} n + \begin{bmatrix} t_{01} \\ t_{02} \end{bmatrix}$$

The set of possible values of the coefficients of U, as well as the possible values of $t_1, t_2, t_{01}$ and $t_{02}$ are defined from the set of constraints D and the constraints that the data $(x'_1, x'_2)$ are enclosed in a rectangular parallelotope of size $(s_1, s_2)$ using Farkas lemma. Then, a value for those coefficients is computed for which the size of the smallest enclosing rectangular parallelotope ($s_1, s_2$ in our example) is minimal. Those values are computed by solving, dimension by dimension of the data set, an integer linear programming problem.

An integer linear programming problem defines a linear function of a set of variables, called the "objective function" and whose minimal (or, alternatively, maximal) value over a polyhedral domain called the "feasible set", is looked for. Solvers for such problems typically return a polyhedral domain, within the feasible set, for which the value of the objective function is minimal. In the running example, the embodiment finds:

$$\begin{bmatrix} x'_1 \\ x'_2 \end{bmatrix} = \begin{bmatrix} 1 & -1 \\ 0 & 1 \end{bmatrix} \begin{bmatrix} x_1 \\ x_2 \end{bmatrix} + \begin{bmatrix} -1 \\ -1 \end{bmatrix} n + \begin{bmatrix} 0 \\ 0 \end{bmatrix}$$

The following pseudo-code represents the program resulting from the data reindexing of array B in our running example:

```
Double A[10][10];
Double B[[2n+20][n+10];
For (i=n; i<n+10; i++) {
    For (j=n; j<n+10; j++) {
        A[i][j] = ... B[j-n][i-n];
    }
}
```

The data footprint of the re-indexed array B is now reduced to 100 memory cells, instead of $n^2+20n+100$ initially.

In one of the exemplary embodiments, the unimodular nature of the reindexing matrix U is obtained by forcing U to be triangular and forcing the absolute value of the diagonal elements to be one. In another embodiment, the unimodular nature of the reindexing matrix is obtained by composition of an upper triangular unimodular and a lower triangular unimodular matrix. The advantage of that other embodiment is that the class of unimodular reindexing functions produced is not limited to the reindexing functions represented by a triangular matrix. Finding those two matrices is equivalent to reindexing data twice, first by finding an upper triangular reindexing matrix as described above and applying the reindexing, and then by finding a lower triangular reindexing matrix for the reindexed set and by applying that second reindexing. Yet another embodiment produces, in the same way, a unimodular reindexing by composition of an upper triangular unimodular matrix, a permutation matrix and a lower triangular unimodular matrix. The advantage of the embodiment is that the class of reindexing function that can be produced is the whole class of integer unimodular matrices.

Figure 7:
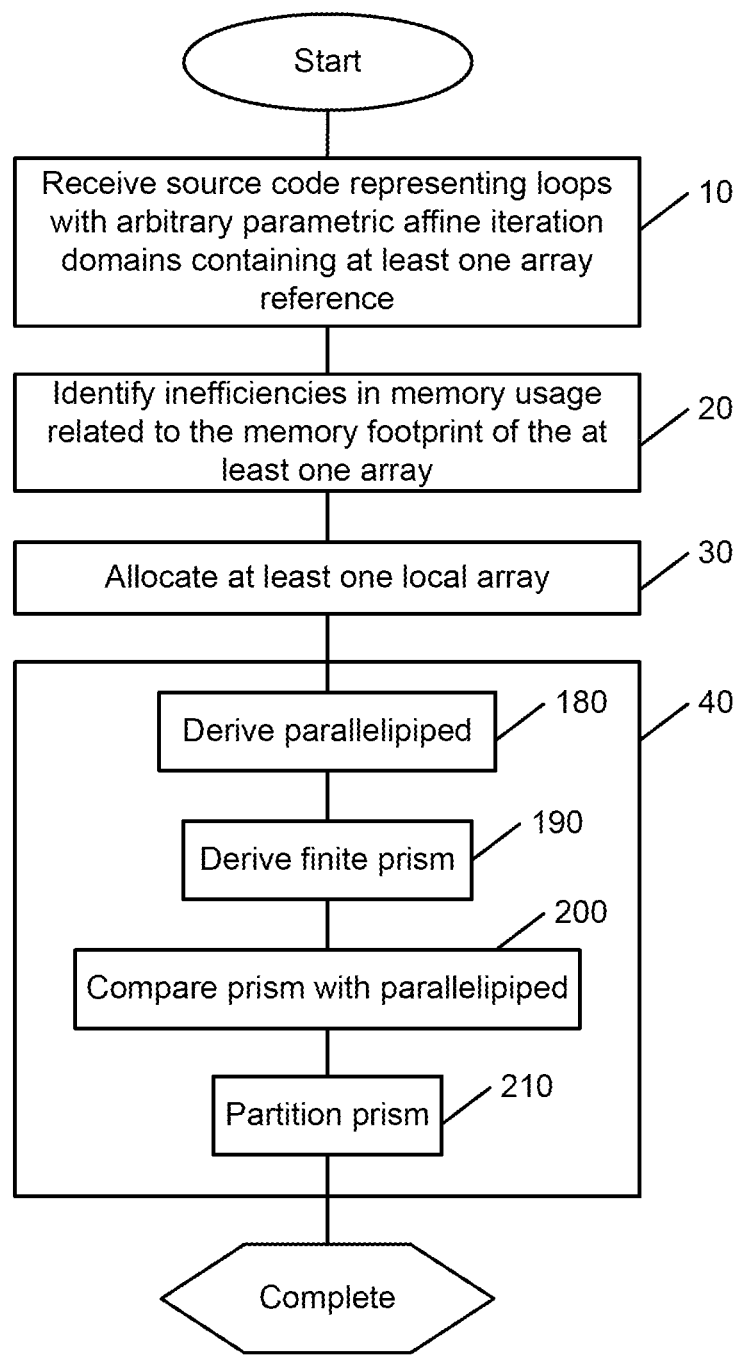
FIG. 7 illustrates the operational flow of an additional local memory compaction module for computing data re-indexing functions by finding a prism of triangular base that encloses the accessed data set and reducing the memory requirements of the enclosed data region by transforming the data elements that lie within a subset of the prism of triangular base.

Turning to FIG. 7 which illustrates another embodiment of a provided method, like the previous embodiments, flow begins in block 10 where source code is received in memory. Similar to the above embodiment, the source code represents loops with arbitrary parametric affine iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this illustration, block 40 contains block 180 where a parallelotope of minimal volume is derived this parallelotope enclosing the domain of the data set accessed by the local arrays. Block 40 additionally contains block 190 where a finite prism of triangular base is derived.

As used herein, a finite prism is a polyhedron defined by a set of translations of a "base" polyhedron, which lies in a subspace of the considered space, by a finite convex set of linear combinations of vectors of the complementary subspace. Since they are finite, it is possible to characterize the maximum extent of a finite prism along the directions of the complementary subspace. In this document, those extents are called "height" of the prism (there is one height along every direction of the complementary subspace). A triangular prism is a prism whose base polyhedron is a triangle. In two dimensions, it is just a triangle. In one embodiment, this finite prism has a minimum volume that encloses the data footprint domain. In block 200 the prism is compared to the parallelotope. In block 210 the prism is partitioned into two prisms. One of the two is then transformed using a central symmetry such that the union of the transformed prism and the non-transformed prism has a smaller memory footprint than the enclosing parallelotope. One advantage of that embodiment is that it provides data layouts that have smaller memory requirements, for a class of accessed datasets for which methods based on parallelotopes are not optimal.

For instance, the dataset accessed by the program represented by the following pseudo-code through reference B is triangular:

```
For (i=0; i< 10; i++) {
    For (j=0; j< i; j++) {
        ... = ... B[i][j];
    }
}
```

The embodiment finds three constraints that enclose the accessed data set, in a similar way as in the embodiment depicted in FIG. 6, using the Farkas lemma. The minimal volume for a parallelotope that encloses the dataset would be about twice the volume of the triangle. Hence, using such a parallelotope to determine the memory allocation of the dataset is bound to be sub-optimal. Instead, the current embodiment, depicted in FIG. 7, defines a tighter enclosing polyhedron using three inequalities (it is then a prism of triangular base). Using the enclosing prism, the data set is partitioned in two subsets, say A and B, and subset A is re-indexed in such a way that both the array elements in B and the re-indexed elements are enclosed in a smaller parallelotope than the original parallelotope. The volume of the new parallelotope is about the volume of the prism of triangular base. Since there is a parallelotope of smaller volume enclosing the reindexed data set, its memory requirements are smaller. The result is a piecewise affine array reindexing, which typically partitions the loop iterations into the iterations that access A, and the ones that access B.

In the current embodiment, the three inequalities {(a): $aI+a_0 \geq 0$; (b): $bI+b_0 \geq 0$; (c): $cI+c0 \geq 0$} that define the triangular prism P, where I is the vector of data coordinates are used to devise the partitioning. Let $x_w$ a point in the intersection of (b) and (c) and let $w=ax_wI+a_0$. The prism is partitioned into A and B as follows:

$$A = P \cap \left\{ aI + a0 - \frac{w+1}{2} \geq 0 \right\}$$

and B=P−A. A point, $x_0$, is defined that is in the domain {$aI+a_0-w+1<0$; $bI+b_0<0$} whose coordinates are a multiple of ½ and whose "height" in the prism is about half of the height of the prism. Array elements that are defined by A are transformed using a central symmetry of center $x_0$. In the program represented by the following pseudo-code, the tightest enclosing parallelotope, defined by {$0 \leq x1 \leq 9$; $0 \leq x2 \leq 9$}, where x1 represents the first dimension of array C and x2 its second dimension, includes 100 array elements.

```
Double C[10][10];
For (i=0; i< 10; i++) {
    For j=0; j< i; j++) {
        ...C[i,j]...;
    }
}
```

The tightest enclosing triangle, defined by {$0 \leq x1$; $0 \leq x2$; $x1+x2 \leq 9$}, by comparison, includes 55 elements, which is about half the number of elements required for the enclosing parallelotope. Since the number of array elements in the enclosing triangle is less than the number of array elements in the enclosing parallelotope, the embodiment considers the tightest enclosing triangle and partitions the enclosed data into data subsets A: {$0 \leq x_1$; $5 \leq x_2$; $x_1+x_2 \leq 9$} and B: {$0 \leq x_1$; $0 \leq x_2 \leq 4$; $x_1+x_2 \leq 9$}. Point $x_0=(5,9/2)$ is selected as center of symmetry and the elements of A are then transformed into a new array subset A' as follows:

$$\left\{ x'_1 = (2*5) - x_1; \ x'_2 = \left(2*\frac{9}{2}\right) - x_2 \right\},$$

where ($x'_1, x'_2$) are the new array element coordinates. The resulting program can be represented by the following code:

```
Double C[11][5];
For (i=0; i< 10; i++) {
    For (j=0; j<=4 && j<i; j++) {
        ...C[i][j]...;
    }
    For (j=5; j<i; j++) {
        ...C[10−i][9−*j]...;
    }
}
```

The accessed data set is included in the parallelotope {$0 \leq x1 < 11, 0 \leq x2 < 5$}, whose memory requirements are of 55 memory cells, i.e., about half of the parallelotope before the transformation. Other data layout optimizations, which are optimal when there is a tight parallelotope enclosing the accessed dataset, will then be more optimal than if applied straightforwardly to the original dataset that can be enclosed more tightly with a triangular prism.

Figure 8:
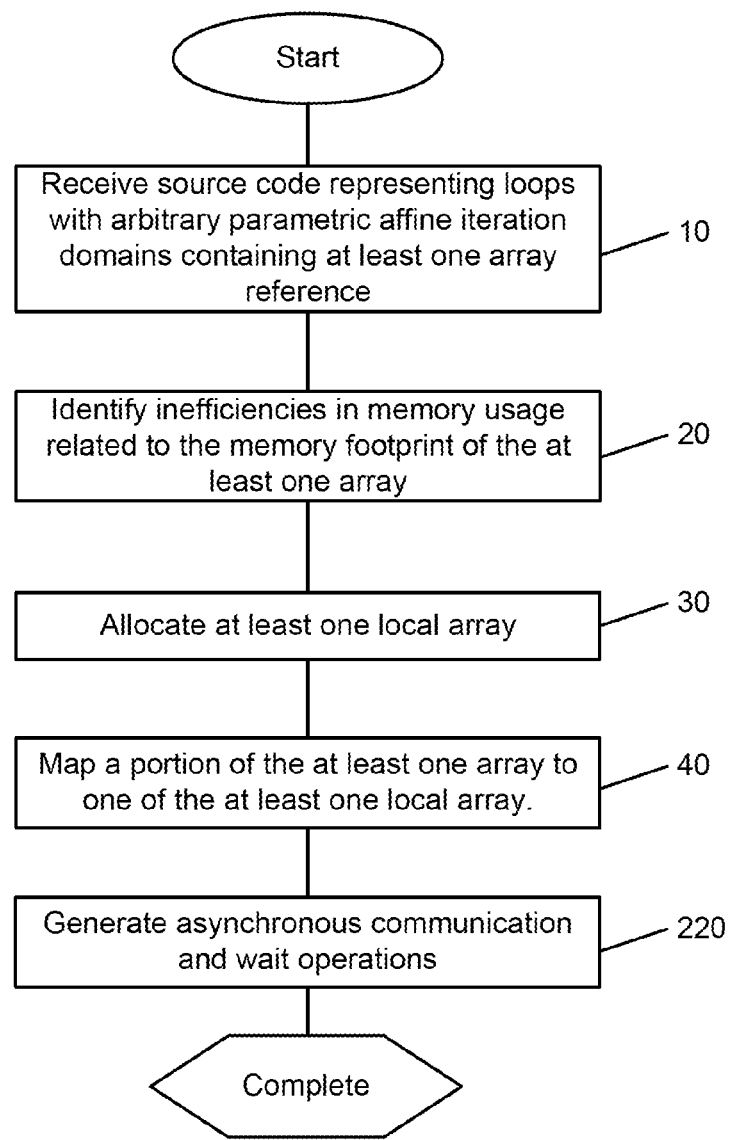
FIG. 8 illustrates the operational flow of an additional local memory compaction module using data re-indexing information to produce abstract communication commands and schedule computations and communications for the program in such a way that their executions overlap.

FIG. 8 illustrates a further embodiment of a provided method. In this embodiment, flow begins in block 10 where source code is received in memory. Similar to the above embodiment, the source code contains loops with arbitrary parametric affine iteration domain and contain at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. Flow then continues to block 220 where asynchronous communications and wait operations are generated. The exemplary embodiment uses the mapping between local memory elements and the elements of the original arrays, in conjunction with a description of the data that are needed as input and produced as output of the tasks to be executed, to produce an abstract representation of the transfers between the original arrays and the local memory elements. In an exemplary embodiment, the generation of these communications and wait operations includes the use of multi-buffering for overlapping communication and computation operations.

Many computers that contain processors that have an explicitly managed local memory also have the ability to transfer data at the same time as they are performing other computations. Such transfers are called "asynchronous". The main reason for using that feature is that the typical time necessary for such transfers is often comparable to the time taken to perform computations between two consecutive transfers of input data. Since doing both transfer and computation at the same time takes less time than doing one after another, the effect of overlapping them is to improve the overall program execution time. The use of several memory zones, specialized to either execution, reception or sending of data, makes the overlap possible. Such a use is called "multi-buffering". The specialization of the buffers is also modified at certain times. Such a modification is called a "rotation of the buffers", since a buffer is cyclically assigned the same specialization.

One embodiment computes a local memory mapping, adds a polyhedral representation of the communications and schedules communications and computations in a multi-buffering scheme for the program represented by the following pseudo-code. In this pseudo-code, every iteration of the k loop works on a distinct instance of local memory:

```
for (k = 0; k <= 7; k++) {
    for (l = 0; l <= 15; l++) {
        for (m = 0; m <= 15; m++) {
            for (n = 16 * k; n <= 16 * k + 15; n++) {
                C[l][m] = C[l][m] + A[l][n] * B[n][m];
            }
        }
    }
}
```

This results in a program that can be represented by the following pseudo-code:

```
for (k = -1; k <= 8; k++) {
    if (k <= 7 && k >= 0) {
        wait(tag=0);
        rotate(vars=[C_l, A_l, B_l]);
    }
    if (k <= 6) {
        for (l = 0; l <= 15; l++) {
            for (m = 0; m <= 15; m++) {
                get(src=&B[l][16 + 16 * k + m],
                    dst=&B_l<1>[l][m], tag=0);
            }
        }
        for (l = 0; l <= 15; l++) {
            for (m = 0; m <= 15; m++) {
                get(source=&A[l][m], destination=&A_l<1>[l][m], tag=0);
            }
        }
        for (l = 0; l <= 15; l++) {
            for (m = 0; m <= 15; m++) {
                get(src=&C[l][16 + 16 * k + m, tag=0);
            }
        }
    }
}
if (k >= 1) wait(tag=1);
if (k <= 7 && k >= 0) {
    for (l = 0; l <= 15; l++) {
        for (m = 16 * k; m <= 16 * k + 15; m++) {
            for (n = 0; n <= 15; n++) {
                C_l[l][-16 * k + m] = C_l[l][-16 * k + m] +
                    B_l[n][-16 * k + m] * A_l[l][n];
            }
        }
    }
    for (l = 0; l <= 15; l++) {
        for (m = 0; m <= 15; m++) {
            put(src=&C_l[l][m], dst=&C[l][16 * k + m], tag=1);
        }
    }
}
}
```

In the code example, "Get" operations are transfers from an original array to a re-indexed array in local memory. "Put" operations are transfers from local memory to original array. While the values of k in the original program were going from 0 to 7, in the multi-buffered version produced by the embodiment they are going from −1 to 8. At iteration k=−1, the first "get" transfers are issued. At iteration k=8, the last "put" transfers are issued. "Wait" operations, which wait for the completion of a series of transfers, were also inserted to ensure that a transferred data set is completed at that point of the program's execution. In the embodiment, a tag system is used to identify the transfers whose completion is to be waited upon. The "rotate" operations operate the buffer rotation.

Figure 9:
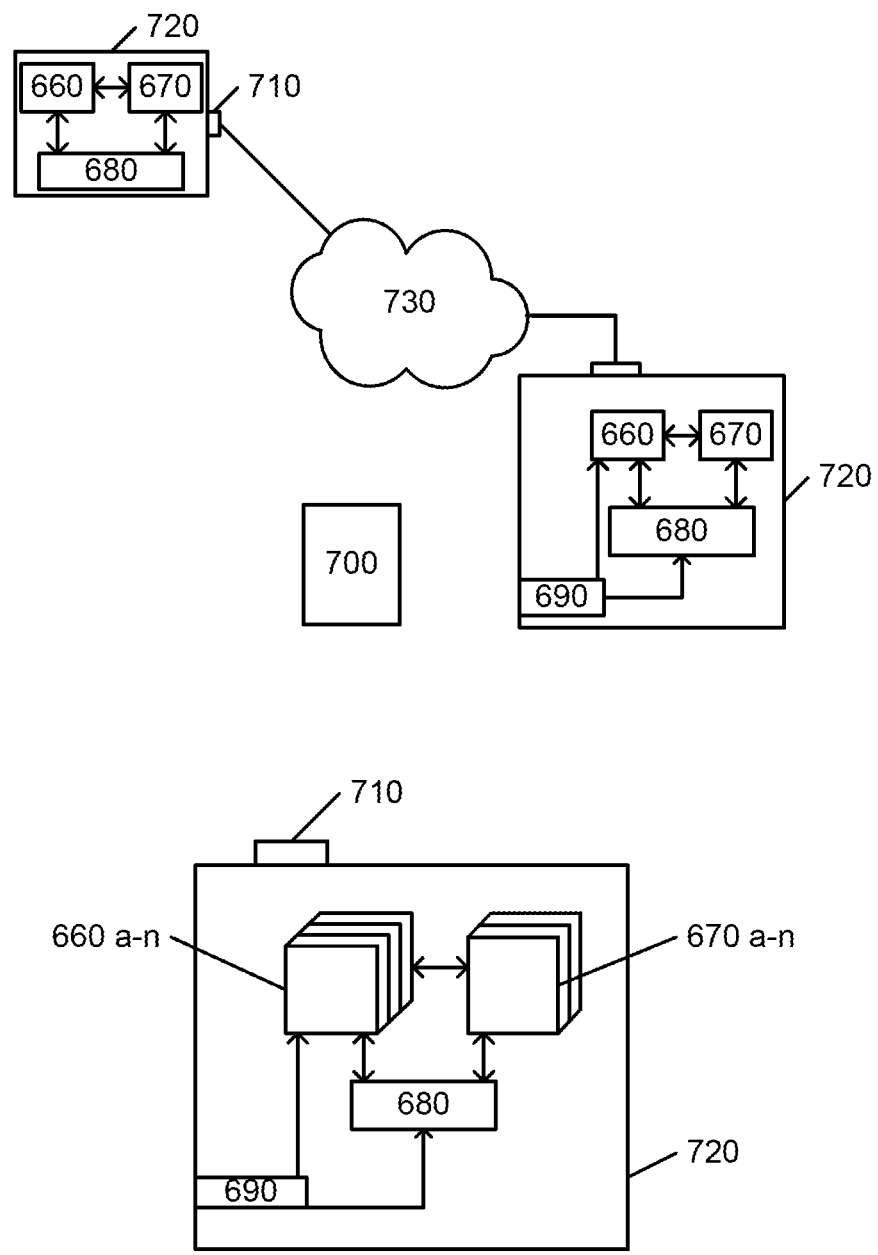
FIG. 9 illustrates a computing apparatus and computer software product consistent with provided embodiments.

Illustrated in FIG. 9 are computing apparatus and computer software products consistent with provided embodiments. Computing apparatus 720 includes processor 660, memory 670, storage medium 680, and in some embodiments input port 690 and network interface 710. In many provided embodiments, storage medium 680 contains a set of processor executable instructions that when executed by processor 660 configure computing apparatus 720 to implement the modules and methods described herein. In one embodiment, storage medium 680, containing the set of processor executable instructions resides in another computing apparatus 720 across network 730. In an embodiment of a computer software product, computer software product 700 is a computer readable storage medium containing processor executable instructions sufficient that when executed by processor 660 configure computing apparatus 720 to implement the above described modules and methods. Further, computer software product, in some embodiments consists of a physical medium configured to interface with input port 690 to allow its contents to be copied to storage medium 680. In other embodiments, computer software product 700 is an internal storage medium, such as 680. An additional embodiment of computing apparatus 720 includes a plurality of processors 680(a-n), a plurality of memories 670(a-n), a storage medium 680 and in some embodiments input port 690 and network connection 710. In some embodiments, one or more processors 680(a-n) is a host, while others are modeled in the form of a grid.

Thus, it is seen that methods apparatus and computer software products for allocating arrays in memories with constrained memory requirements according to the way those arrays are accessed is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method for configuring a memory in a computing apparatus, the computing apparatus comprising at least one processor, the method comprising:
   receiving program source code in a memory, the program source code comprising loop nests with arbitrary parametric affine iteration domain containing at least one array reference;
   identifying during compilation, based on at least in part an analysis of the program source code, by the at least one processor and a local memory compaction module, inefficiencies in memory usage, the inefficiencies relating to at least one of access to and memory footprint of at least one array associated with the at least one array reference within the program source code;

allocating during the compilation of the program source code, by the processor and the local memory compaction module, at least one local array for accessing at least a fraction of data associated with the at least one array; and mapping during the compilation, by the processor and the local memory compaction module, a portion of the at least one array to one of the at least one local array, wherein the memory size requirement of the at least one local array is smaller than the memory size requirements of the at least one array, such that the memory usage inefficiencies are reduced in compiled program source code.

2. The method of claim 1, wherein the mapping further comprises:

partitioning a set of references to form sets of compatible references, the set of references accessing a portion of the at least one array;

determining a relation within the compatible references;

grouping compatible references based on the relation;

performing algebraic simplification on a group of compatible references; and performing geometric rearrangement through re-indexing of the elements of the at least one local array.

3. The method of claim 2, wherein the compatible references are references whose memory footprints overlap during the execution of a particular subset of loop iterations.

4. The method of claim 2, wherein the determination further comprises identifying array references whose memory footprints overlap;

duplicating the identified references; and associating each duplicate reference to disjoint subsets of the memory footprints.

5. The method of claim 1, wherein identifying inefficiencies comprises identifying strides in the domain of array elements accessed through references, the method further comprising extracting a lattice of integer points within the domain, the lattice related to holes within the domain.

6. The method of claim 1, wherein the accessed data set is arbitrarily complex.

7. The method of claim 2, wherein the mapping produces a piecewise affine index function for at least one local array.

8. The method of claim 7, wherein the mapping further comprises extracting at least one representative array reference from a set of references accessing a portion of the at least one array.

9. The method of claim 8, wherein the at least one representative array reference is at least one representative access matrix, the mapping further comprising performing a Hermite factorization for each of the at least one representative access matrix and producing a piecewise affine index function from the factorization.

10. The method of claim 7, wherein the mapping comprises performing the following at least once:

formulating a set of linear constraints by using the affine form of the Farkas lemma;

decomposing the linear constraints dimension by dimension to form resulting integer linear programming problems;

solving the resulting integer linear programming problems to compute the reindexing function, the linear part of the reindexing function being represented as a unimodular matrix; and apply the reindexing to the at least one array.

11. The method of claim 7, further comprising:

deriving a parallelepiped with minimal volume, the parallelepiped enclosing the domain of the data set accessed by the at least one local array;

deriving a finite prism of triangular base and of minimal volume enclosing the data footprint domain and comparing it to the parallelepiped with minimal volume;

partitioning the prism of triangular base into two prisms; and rotating one of the prisms in such a way that the union of the rotated prism and the other prism has a smaller memory footprint than the enclosing parallelepiped.

12. The method of claim 1, further comprising generating asynchronous communication and wait operations.

13. The method of claim 12, wherein the generating asynchronous communication and wait operations further comprises using multi-buffering for overlapping communication and computation.

14. A computing apparatus comprising:

a memory;

at least one processor; and a storage medium, the storage medium comprising a set of processor executable instructions that, when executed by the processor configure the computing apparatus to:

receive program source code in the memory, the program source code comprising loop nests with arbitrary parametric affine iteration domain containing at least one array reference;

identify during compilation, based on at least in part an analysis of the program source code, by the at least one processor, inefficiencies in memory usage, the inefficiencies relating to at least one of access to and memory footprint of at least one array associated with the at least one array reference within the program source code;

allocate, during the compilation of the program source code, at least one local array for accessing at least a fraction of data associated with the at least one array; and map during the compilation, a portion of the at least one array to one of the at least one local array, wherein the memory size requirement of the at least one local array is smaller than the memory size requirements of the at least one array, such that the memory usage inefficiencies are reduced in compiled program source code.

15. The computing apparatus of claim 14, wherein the configuration for mapping further comprises a configuration to:

partition a set of references to form sets of compatible references, the set of references accessing a portion of the at least one array;

determine a relation within the compatible references;

group compatible references based on the relation;

perform algebraic simplification on a group of compatible references; and perform geometric rearrangement through re-indexing of the elements of the at least one local array.

16. The computing apparatus of claim 15, wherein the compatible references are references whose memory footprints overlap during the execution of a particular subset of loop iterations.

17. The computing apparatus of claim 15, wherein the configuration to determine a relation further comprises a determination to:

identify array references whose memory footprints overlap;

duplicate the identified references; and associate each duplicate reference to disjoint subsets of the memory footprints.

18. The computing apparatus of claim 14, wherein the configuration to identify inefficiencies comprises a configuration to identify strides in the domain of array elements accessed through references, and extract a lattice of integer points within the domain, the lattice related to holes within the domain.

19. The computing apparatus of claim 14, wherein the accessed data set is arbitrarily complex.

20. The computing apparatus of claim 15, wherein the configuration to map produces a piecewise affine index function for at least one local array.

21. The computing apparatus of claim 20, wherein the configuration to map further comprises a configuration to extract at least one representative array reference from a set of references accessing a portion of the at least one array.

22. The computing apparatus of claim 21, wherein the at least one representative array reference is at least one representative access matrix, the configuration to map further comprising a configuration to perform a Hermite factorization for each of the at least one representative access matrix and produce a piecewise affine index function from the factorization.

23. The computing apparatus of claim 20, wherein the configuration to map comprises a configuration to perform the following at least once:
formulate a set of linear constraints by using the affine form of the Farkas lemma;
decompose the linear constraints dimension by dimension to form resulting integer linear programming problems;
solve the resulting integer linear programming problems to compute the reindexing function, the linear part of the reindexing function being represented as a unimodular matrix; and
apply the reindexing to the at least one array.

24. The computing apparatus of claim 20, wherein the configuration further comprises a configuration to:
derive a parallelepiped with minimal volume, the parallelepiped enclosing the domain of the data set accessed by the at least one local array;
derive a finite prism of triangular base and of minimal volume enclosing the data footprint domain and comparing it to the parallelepiped with minimal volume;
partition the prism of triangular base into two prisms; and
rotate one of the prisms in such a way that the union of the rotated prism and the other prism has a smaller memory footprint than the enclosing parallelepiped.

25. The computing apparatus of claim 14, wherein the configuration further comprises a configuration to generate asynchronous communication and wait operations.

26. The computing apparatus of claim 25, wherein the configuration to generate asynchronous communication and wait operations further comprises a configuration to use multi-buffering for overlapping communication and computation.

27. A computer software product comprising a computer readable medium containing a set of processor executable instructions that when executed by a processor in a computing apparatus configure the computing apparatus to:
receive program source code in a memory within the computing apparatus, the program source code comprising loop nests with arbitrary parametric affine iteration domain containing at least one array reference;
identify, during compilation, based on at least in part an analysis of the program source code, by the at least one processor, inefficiencies in memory usage, the inefficiencies relating to at least one of access to and memory footprint of at least one array associated with the at least one array reference within the program source code;
allocate, during the compilation of the program source code, at least one local array for accessing at least a fraction of data associated with the at least one array; and
map during the compilation, a portion of the at least one array to one of the at least one local array, wherein the memory size requirement of the at least one local array is smaller than the memory size requirements of the at least one array, such that the memory usage inefficiencies are reduced in compiled program source code.

28. The computer software product of claim 27, wherein the configuration to map further comprises a configuration to:
partition a set of references to form sets of compatible references, the set of references accessing a portion of the at least one array;
determine a relation within the compatible references;
group compatible references based on the relation;
perform algebraic simplification on a group of compatible references; and
perform geometric rearrangement through re-indexing of the elements of the at least one local array.

29. The computer software product of claim 28, wherein the compatible references are references whose memory footprints overlap during the execution of a particular subset of loop iterations.

30. The computer software product of claim 28, wherein the configuration to determine a relation further comprises a determination to:
identify array references whose memory footprints overlap;
duplicate the identified references; and
associate each duplicate reference to disjoint subsets of the memory footprints.

31. The computer software product of claim 28, wherein the configuration to identify inefficiencies comprises a configuration to identify strides in the domain of array elements accessed through references, and extract a lattice of integer points within the domain, the lattice related to holes within the domain.

32. The computer software product of claim 27, wherein the accessed data set is arbitrarily complex.

33. The computer software product of claim 28, wherein the configuration to map produces a piecewise affine index function for at least one local array.

34. The computer software product of claim 33, wherein the configuration to map further comprises a configuration to extract at least one representative array reference from a set of references accessing a portion of the at least one array.

35. The computer software product of claim 34, wherein the at least one representative array reference is at least one representative access matrix, the configuration to map further comprises a configuration to perform a Hermite factorization for each of the at least one representative access matrix and produce a piecewise affine index function from the factorization.

36. The computer software product of claim 33, wherein the configuration to map comprises a configuration to perform the following at least once:
formulating a set of linear constraints, the constraints being related to the data reindexing function by using the affine form of the Farkas lemma;
decompose the linear constraints dimension by dimension to form resulting integer linear programming problems;

solve the resulting integer linear programming problems to compute the reindexing function, the linear part of the reindexing function being represented as a unimodular matrix; and apply the reindexing to the at least one array.

37. The computer software product of claim 33, wherein the configuration further comprises a configuration to:
derive a parallelepiped with minimal volume, the parallelepiped enclosing the domain of the data set accessed by the at least one local array;
derive a finite prism of triangular base and of minimal volume enclosing the data footprint domain and comparing it to the parallelepiped with minimal volume;
partition the prism of triangular base into two prisms; and
rotate one of the prisms in such a way that the union of the rotated prism and the other prism has a smaller memory footprint than the enclosing parallelepiped.

38. The computer software product of claim 27, wherein the configuration further comprises a configuration to generate asynchronous communication and wait operations.

39. The computer software product of claim 38, wherein the configuration to generate asynchronous communication and wait operations further comprises a configuration to use multi-buffering for overlapping communication and computation.

* * * * *